US009832199B2

(12) United States Patent
Boivie et al.

(10) Patent No.: US 9,832,199 B2
(45) Date of Patent: Nov. 28, 2017

(54) PROTECTING ACCESS TO HARDWARE DEVICES THROUGH USE OF A SECURE PROCESSOR

(71) Applicant: INTERNATIONAL BUSINESS MACHINES CORPORATION, Armonk, NY (US)

(72) Inventors: Richard H. Boivie, Monroe, CT (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/865,504

(22) Filed: Sep. 25, 2015

(65) Prior Publication Data
US 2017/0093853 A1    Mar. 30, 2017

(51) Int. Cl.
*H04L 29/06* (2006.01)
*G06F 21/00* (2013.01)

(52) U.S. Cl.
CPC ........... *H04L 63/10* (2013.01); *G06F 21/00* (2013.01); *H04L 63/0428* (2013.01); *H04L 63/08* (2013.01)

(58) Field of Classification Search
None
See application file for complete search history.

(56) References Cited

U.S. PATENT DOCUMENTS

| 7,941,640 B1 * | 5/2011 | Rainnie ............... G06F 9/30178 712/208 |
| 8,578,175 B2 | 11/2013 | Boivie et al. |
| 8,745,373 B2 | 6/2014 | Molsberry et al. |

(Continued)

FOREIGN PATENT DOCUMENTS

| GB | 2481426 A * | 12/2011 | ......... H04L 63/0428 |
| WO | 2004025472 A1 | 3/2004 | |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Malcolm Cribbs
(74) *Attorney, Agent, or Firm* — Law Office of Jim Boice

(57) ABSTRACT

A computer-implemented method, system, and/or computer program product protects access to hardware devices through use of a secure processor. A security computer receives a request from a requesting computer for access to a hardware device on a network. A secure processor within the security computer encrypts the request to generate an encrypted request, which is generated within a core of the secure processor. The secure processor protects a secure application that is used to process the request from other software on the secure processor. The security computer transmits the encrypted request to the hardware device, and then receives an encrypted acknowledgement of the encrypted request from a processor associated with the hardware device. The security computer then creates a communication session between the requesting computer and the hardware device.

17 Claims, 14 Drawing Sheets

(56) References Cited

U.S. PATENT DOCUMENTS

| | | | |
|---|---|---|---|
| 8,819,446 B2 | 8/2014 | Boivie | |
| 8,839,004 B1* | 9/2014 | Bennett | G06F 21/575 713/189 |
| 8,954,752 B2 | 2/2015 | Boivie et al. | |
| 9,098,442 B2 | 8/2015 | Boivie et al. | |
| 9,225,720 B1* | 12/2015 | Chandrasekhar | H04L 63/10 |
| 9,231,946 B2* | 1/2016 | Loo | |
| 9,419,942 B1* | 8/2016 | Buruganahalli | H04L 63/0227 |
| 2002/0071427 A1* | 6/2002 | Schneider | H04L 12/5601 370/352 |
| 2002/0073334 A1* | 6/2002 | Sherman | G06F 21/88 726/34 |
| 2004/0260821 A1* | 12/2004 | Yamamoto | H04L 61/3035 709/229 |
| 2005/0114663 A1 | 5/2005 | Cornell et al. | |
| 2006/0005032 A1* | 1/2006 | Cain | H04L 63/105 713/182 |
| 2006/0075014 A1* | 4/2006 | Tharappel | H04L 63/0428 709/202 |
| 2006/0085839 A1* | 4/2006 | Brandt | G05B 19/4185 726/2 |
| 2006/0112418 A1* | 5/2006 | Bantz | G06F 21/88 726/4 |
| 2007/0203970 A1* | 8/2007 | Nguyen | H04L 63/0823 709/201 |
| 2008/0046961 A1* | 2/2008 | Pouliot | H04L 63/10 726/1 |
| 2009/0132808 A1* | 5/2009 | Baentsch | H04L 63/0471 713/152 |
| 2010/0107225 A1* | 4/2010 | Spencer | H04L 63/0876 726/4 |
| 2011/0231443 A1* | 9/2011 | Hannel | H04L 63/105 707/776 |
| 2014/0096226 A1* | 4/2014 | Barkan | G06F 21/57 726/11 |
| 2014/0122902 A1* | 5/2014 | Isozaki | G06F 12/1408 713/193 |
| 2014/0245395 A1* | 8/2014 | Hulse | H04L 63/101 726/4 |
| 2014/0365670 A1* | 12/2014 | Wang | H04W 12/08 709/227 |
| 2014/0380512 A1* | 12/2014 | Sturtevant | G06F 21/606 726/30 |
| 2015/0012977 A1* | 1/2015 | Huh | G06F 9/468 726/4 |
| 2015/0058926 A1* | 2/2015 | Archer | H04L 63/10 726/3 |
| 2015/0169851 A1 | 6/2015 | Boivie et al. | |
| 2015/0186621 A1* | 7/2015 | Uy | G06F 21/10 726/26 |
| 2015/0229638 A1* | 8/2015 | Loo | G06Q 10/10 726/9 |
| 2015/0317490 A1* | 11/2015 | Carey | G06F 19/28 726/26 |
| 2015/0319174 A1* | 11/2015 | Hayton | H04L 63/10 726/7 |

OTHER PUBLICATIONS

R. Boivie, "SecureBlue++: CPU Support for Secure Execution", IBM, IBM Research Division, RC25287 (WAT1205-070), May 23, 2012, pp. 1-9.

Anonymous, "SCADA", Wikimedia Foundation, Inc., wikipedia.org, last modified Sep. 21, 2015, retrieved Sep. 25, 2015, pp. 1-11.

* cited by examiner

PROTECTING ACCESS TO HARDWARE DEVICES THROUGH USE OF A SECURE PROCESSOR

BACKGROUND

The present disclosure relates to the field of computers, and specifically to computers on a network. Still more particularly, the present disclosure relates to protecting hardware resources on a network.

Computer networks often include hardware resources (e.g., storage devices, actuators, sensors, etc.) that are accessible by a server computer and one or more client computers. The server computer often handles operations on behalf of the client computer, such as providing access to hardware resources, executing applications, providing memory and computing resources, etc. Such operations performed by the server often require a high level of trust between the client and the server and the hardware resources, which may or may not be warranted, due to insecure connections between the server and client, distrust of who is able to access the hardware resources, etc.

Current computing across a network and in "the cloud" (a network of shared hardware and/or software resources) has proved to be especially problematic in terms of security. A great majority of nefarious attacks on computer resources, servers, clients, etc. come through an attack on an operating system (O/S) on a device, or an attack directly on an application running on the device (e.g., by using a structured query language—SQL injection and buffer overflow associated with buffer(s) used by the application). Current protection mechanisms are dependent upon pre-discovering potential exposures and constant and instant patches (software improvements). This results in a high risk quotient and need for additional supporting workload.

Various approaches to protecting resources on a network have been proposed in the prior art.

For example, U.S. Patent Application Publication No. 2005/0114663 filed by Cornell et al., teaches the use of encryption keys that are embedded in the hardware of the first connection point and the trusted partner, in order to encrypt network traffic that can be sent on the trusted link. By embedding the encryption keys in the hardware, as opposed to implementing the encryption keys in software, the encryption algorithm can be made more secure and efficient. However, such embedded keys are not scalable, and thus are not practical if access is attempted to large numbers of connection points. Furthermore, this approach does not protect access to non-computing hardware devices.

In another example of the relevant prior art, U.S. Pat. No. 8,745,373 issued to Molsberry et al. teaches a system of selectively encrypting inbound data on the basis of an encryption policy, which specifies what kind of encryption to apply, using the provided instructions. This approach optimizes resource usage by only encrypting when necessary, but does not provide protection of access to hardware devices.

In another example of the relevant prior art, WIPO patent application WO 2004/025472 filed by Wholepoint Corporation (Inventors Ocepek et al.) teaches a method and apparatus for controlling data link layer access to protected servers on a computer network by a client device. If the client device is unknown, then restriction address resolution replies are transmitted to the protected devices to restrict access by the client device. If an authentication server determines that the client device is unauthorized, then access by the client device to all other network devices is blocked. This approach still does not protect access to hardware devices with the level of security that is often required.

Thus, the present invention provides a new and novel solution to these and other problems found in the prior art.

SUMMARY

In one embodiment of the present invention, a computer-implemented method, system, and/or computer program product protects access to hardware devices through the use of a secure processor. A security computer receives a request from a requesting computer for access to a hardware device on a network. In response to receiving the request, a first secure processor within the security computer encrypts the request to generate an encrypted request, where the encrypted request is generated within a core of the first secure processor, and where the first secure processor protects a secure application used to process the request from other software on the first secure processor. The security computer transmits the encrypted request to the hardware device. The encrypted request includes an address and identification of the requesting computer. The security computer then receives an encrypted acknowledgement of the encrypted request. The encrypted acknowledgement was generated by a processor associated with the hardware device. In response to receiving the encrypted acknowledgement, the security computer decrypts the encrypted acknowledgement and creates a communication session between the requesting computer and the hardware device. This embodiment provides a new and novel advantage over the prior art of protecting access to hardware devices with the greater security provided by the secure processor(s).

In one embodiment of the present invention, access to the hardware device is established by an application, and the computer-implemented method further includes controlling, by the first secure processor, access to the hardware device by the requesting computer by requiring the requesting computer to provide an encrypted private key needed by the first secure processor to access an operating system that is required to execute the application that accesses the hardware device. This embodiment provides additional security to the hardware device by requiring that additional layers of security be provided. Specifically, in order to execute the application that accesses the hardware device, its underlying operating system must first be accessed. However, in order to access this operating system, an encrypted private key must first be supplied to the security computer, which is then able to unlock access to the operating system. These additional layers of protection for hardware devices on a network are not found in the prior art.

In one embodiment of the present invention, the hardware device (e.g., a hardware sensor) is further protected by a third secure processor in an access system (e.g., a legacy sensor access system). In order to access the hardware device (e.g., the legacy sensor), the third secure processor decrypts the encrypted request in order to open a port between the legacy sensor and the security computer. This additional layer of access control to the hardware device (e.g., the legacy sensor) provides an additional layer of protection to the hardware device that is not found in the prior art.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
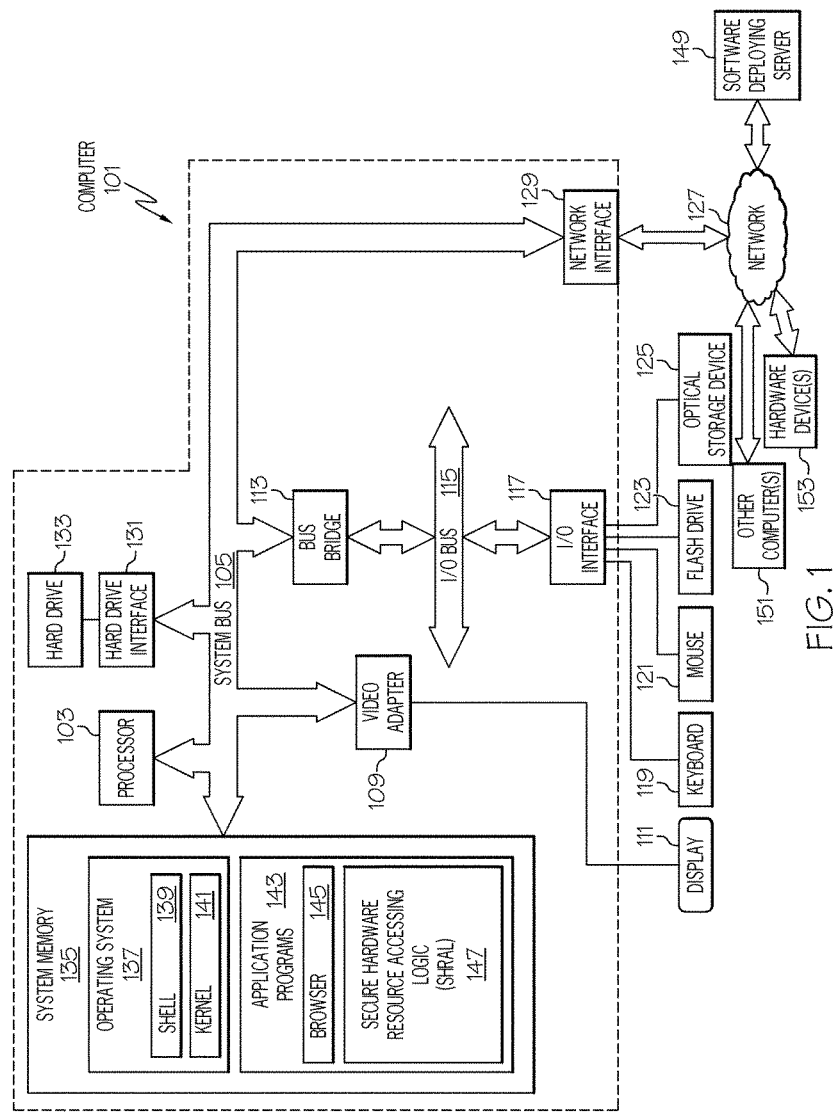
FIG. 1 depicts an exemplary computer system and/or network which may be utilized by the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and particularly to FIG. 1, there is depicted a block diagram of an exemplary computer 101, which the present invention may utilize. Note that some or all of the exemplary architecture shown for computer 101 may be utilized by software deploying server 149 and/or other computer(s) 151 shown in FIG. 1.

Computer 101 includes a processor 103, which may utilize one or more processors each having one or more processor cores 105. Processor 103 is coupled to a system bus 107. A video adapter 109, which drives/supports a display 111, is also coupled to system bus 107. System bus 107 is coupled via a bus bridge 113 to an Input/Output (I/O) bus 115. An I/O interface 117 is coupled to I/O bus 115. I/O interface 117 affords communication with various I/O devices, including a keyboard 119, a mouse 121, a Flash Drive 123, and an optical storage device 125 (e.g., a CD or DVD drive). The format of the ports connected to I/O interface 117 may be any known to those skilled in the art of computer architecture, including but not limited to Universal Serial Bus (USB) ports.

Computer 101 is able to communicate with a software deploying server 149 and other devices via network 127 using a network interface 129, which is coupled to system bus 107. Network 127 may be an external network such as the Internet, or an internal network such as an Ethernet or a Virtual Private Network (VPN). Network 127 may be a wired or wireless network, including but not limited to cellular networks, Wi-Fi networks, hardwired networks, etc.

A hard drive interface 131 is also coupled to system bus 107. Hard drive interface 131 interfaces with a hard drive 133. In a preferred embodiment, hard drive 133 populates a system memory 135, which is also coupled to system bus 107. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a World Wide Web (WWW) client (i.e., computer 101) to send and receive network messages to the Internet using HyperText Transfer Protocol (HTTP) messaging, thus enabling communication with software deploying server 149 and other described computer systems.

Application programs 143 in computer 101's system memory (as well as software deploying server 149's system memory) also include a Secure Hardware Resource Accessing Logic (SHRAL) 147. SHRAL 147 includes code for implementing the processes described below in FIGS. 2-3 and 5-9. In one embodiment, computer 101 is able to download SHRAL 147 from software deploying server 149, including in an on-demand basis. Note further that, in one embodiment of the present invention, software deploying server 149 performs all of the functions associated with the present invention (including execution of SHRAL 147), thus freeing computer 101 from having to use its own internal computing resources to execute SHRAL 147.

Also coupled to computer 101 via network 127 are other computer(s) 151, which may be client computers, other servers, etc. Also coupled to computer 101 via network 127 are hardware device(s) 153, which are hardware resources such as hardware sensors, hardware actuators, mechanical/manufacturing equipment, etc., all of which have logic that allows them to electronically communicate with computer 101 via network 127.

The hardware elements depicted in computer 101 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Assume now that computer 101 is acting as a security manager between other computer(s) 151 (e.g., between computers from computer(s) 151) and/or hardware device(s) 153). As such, FIG. 2 provides detail of data protection provided by a security computer 201 (analogous to computer 101 shown in FIG. 1) on a network (e.g., network 127 shown in FIG. 1).

Various embodiments of the present invention allow a requesting computer to securely request that another computer execute an application within that other computer, and/or securely access and/or control a remote hardware device.

Figure 2:
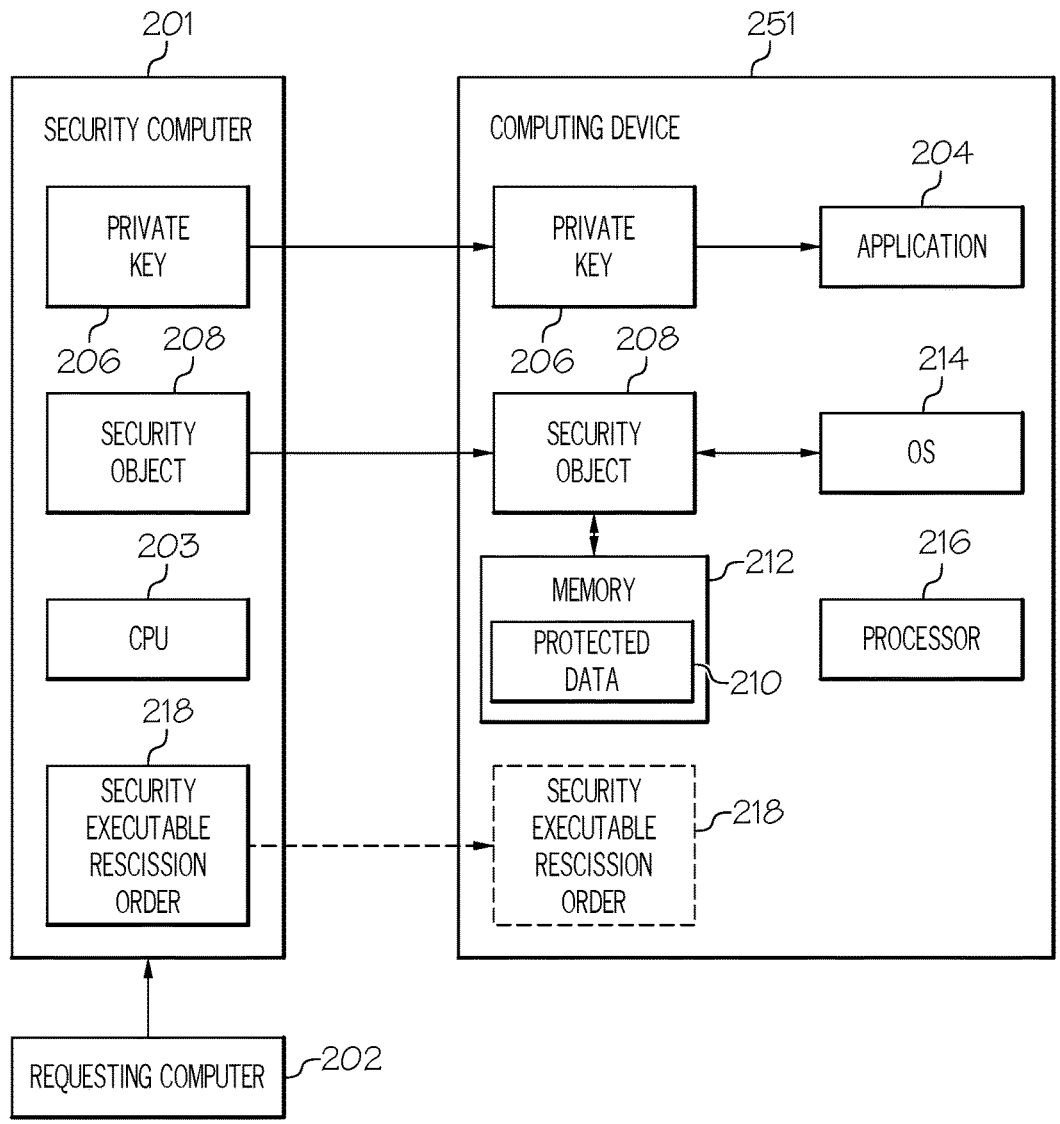
FIG. 2 illustrates a functional relationship between a requesting computer, a security computer, and a computing device in a network in accordance with one or more embodiments of the present invention.

With reference now to FIG. 2, assume that a requesting computer 202 (analogous to one of the other computer(s) 151 shown in FIG. 1) wants computing device 251 (also analogous to one of the other computer(s) 151 shown in FIG. 1) to execute an application 204 that is within computing device 251. Assume further that application 204 is encrypted. Thus, a private key 206 is sent from the security computer 201 to the computing device 251. In addition, the security computer 201 can send a security object 208 to computing device 251. The security object 208 (e.g., a cryptographic key, a security executable, etc.) is required to access an application (e.g., application 204) or protected data (e.g., protected data 210) from a memory 212 within (or used by) the computing device 251. Memory 212 may be system memory, L3 cache memory, or even persistent memory (e.g., a flash drive, a hard drive, etc.) used by computing device 251.

Assume now that an operating system (OS) 214 within computing device 251 wants the processor 216 in computing device 251 to use protected data 210 as inputs to application 204. Rather than trust OS 214 to directly access the protected data 210 in memory 212, security object 208 must be used, as depicted in exemplary manner in FIG. 3. In one embodiment, security object 208 is compilable and/or executable software code that performs the processes described herein to access protected data 210. In another embodiment, security object 208 is a credential, token, key, or other object that is used by an executable program to afford access to the protected data 210 described herein.

In one embodiment of the present invention, a security executable rescission order 218 is transmitted to the computing device 251. The security executable rescission order 218 prevents the processor 216 within the computing device 251 from further utilizing the protected data 210 required by the secure software application 204. That is, assume that computing device 251 is utilizing security object 208 to access protected data 210 needed for inputs to application 204. Security computer 201 can stop this process by sending a security executable rescission order 218 to computing device 251, which blocks OS 214 from utilizing security object 208. For example, assume that each time protected data 210 is accessed through the use of the security object 208, only a limited amount of data (e.g., a line, page, block, heap, etc.) can be accessed before security object 208 must again be invoked (to access the next line/page/block/etc.). Thus, by disabling the security object 208, no new data can be accessed from the memory 212.

Figure 3:
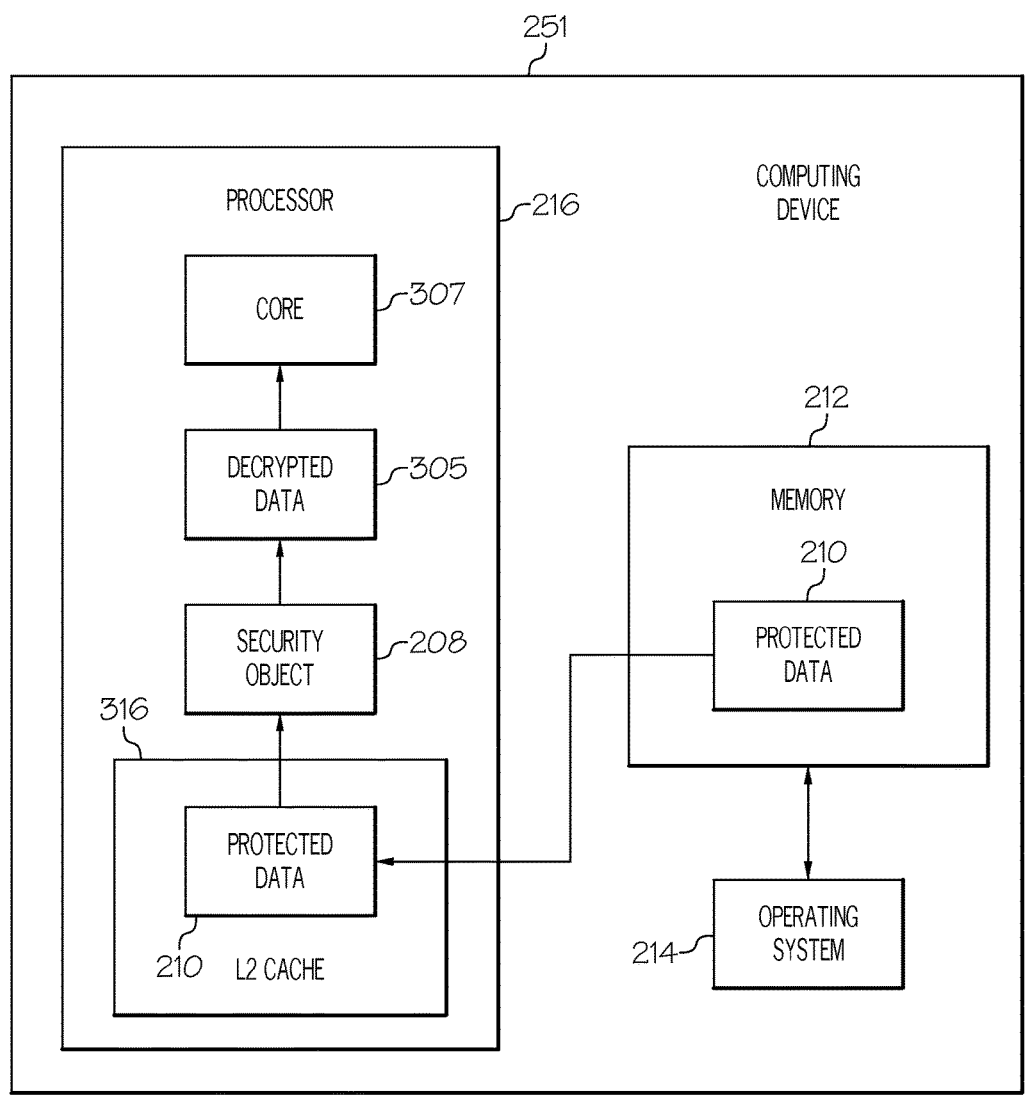
FIG. 3 depicts additional detail of the computing device shown in FIG. 2.

With reference now to FIG. 3, additional detail of the use of protected data 210 in the computing device 251 shown in FIG. 2 is presented. Continue to assume that protected data 210 is encrypted. However, rather than decrypting the protected data before sending it to a cache (e.g., L2 cache 316), the protected data 210 is sent to L2 cache 316 in its encrypted form. In this encrypted form, application 204 (see FIG. 2) is unable to use protected data 210 as inputs. However, as depicted in FIG. 3, the security object 208 is able to decrypt the protected data 210 within the processor 216 in order to generate decrypted data 305, which can then be sent to the core 307 (for example and more specifically, to an L1 data cache 420—see FIG. 4) of processor 216 for execution. Note again that this decryption takes place within the processor 216, and decrypted data is allowed only within the confines of processor 216. That is, the decrypted data 305 cannot leave the confines of the processor 216, but rather must be re-encrypted before being sent to memory 212 or other resources that are outside of the processor 216. Since all actions taken to decrypt the protected data 210 occur within the processor 216, a user of processor 216 (e.g., the owner of computing device 251) is unable to access, in a usable/decrypted form, potentially sensitive data that is provided by the owner of the requesting computer 202 shown in FIG. 2.

Note further that while, for purposes of clarity, the memory 212 shown in FIG. 3 depicts only the protected data 210 as being contained within memory 212, is it understood in one embodiment that memory 212 (e.g., system memory) will also contain OS 214, security object 208, application 204 and/or private key 206, as may be required for implementing the invention disclosed herein.

Thus, a "secure processor" is defined as a processor in which all encryption and decryption processes occur within the processor, such that no decrypted data (i.e., encrypted data that has been decrypted by the processor) is allowed to exit the processor, as described for processor 216 in FIG. 2 and FIG. 3.

Figure 4:
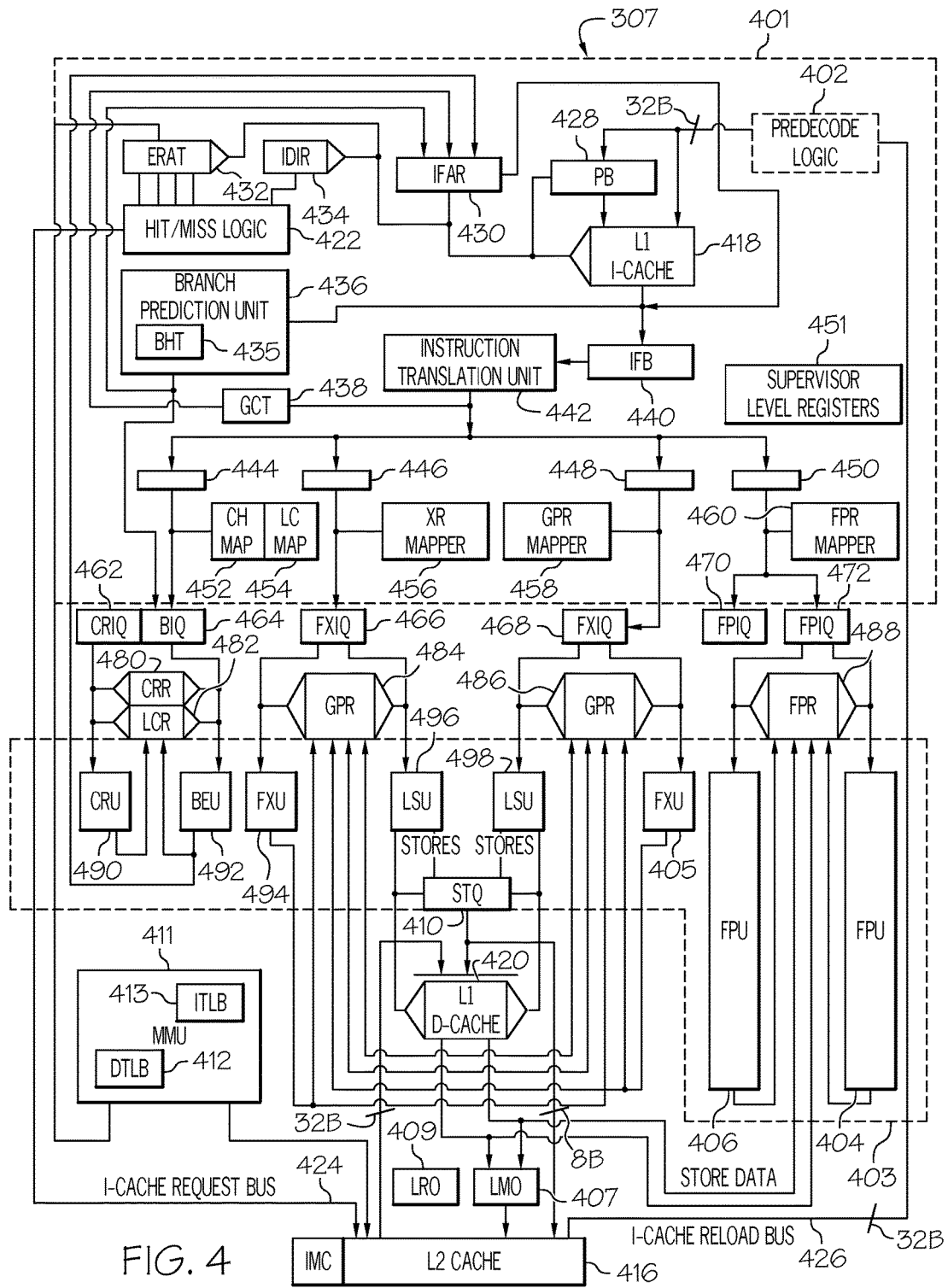
FIG. 4 illustrates exemplary detail of core within a secure processor.

With reference now to FIG. 4, additional exemplary detail of core 307 depicted in FIG. 3 is presented. Core 307 includes an on-chip multi-level cache hierarchy including a unified level two (L2) cache 416 and bifurcated level one (L1) instruction (I) and data (D) caches 418 and 420, respectively. As is well-known to those skilled in the art, caches 416, 418 and 420 provide low latency access to cache lines corresponding to memory locations in system memories (e.g., system memory 135 shown in FIG. 1).

Instructions are fetched for processing from L1 I-cache 418 in response to the effective address (EA) residing in instruction fetch address register (IFAR) 430. During each cycle, a new instruction fetch address may be loaded into IFAR 430 from one of three sources: branch prediction unit (BPU) 436, which provides speculative target path and sequential addresses resulting from the prediction of conditional branch instructions, global completion table (GCT) 438, which provides flush and interrupt addresses, and branch execution unit (BEU) 492, which provides non-speculative addresses resulting from the resolution of predicted conditional branch instructions. Associated with BPU 436 is a branch history table (BHT) 435, in which are recorded the resolutions of conditional branch instructions to aid in the prediction of future branch instructions.

An effective address (EA), such as the instruction fetch address within IFAR 430, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 307, effective-to-real address translation is performed by memory management units (MMUs) and associated address translation facilities. Preferably, a separate MMU is provided for instruction accesses and data accesses. In FIG. 4, a single MMU 411 is illustrated, for purposes of clarity, showing connections only to Instruction Store Unit (ISU) 401. However, it is understood by those skilled in the art that MMU 411 also preferably includes connections (not shown) to load/store units (LSUs) 496 and 498 and other components necessary for managing memory accesses. MMU 411 includes Data Translation Lookaside Buffer (DTLB) 412 and Instruction Translation Lookaside Buffer (ITLB) 413. Each TLB contains recently referenced page table entries, which are accessed to translate EAs to RAs for data (DTLB 412) or instructions (ITLB 413). Recently referenced EA-to-RA translations from ITLB 413 are cached in EOP effective-to-real address table (ERAT) 432.

If hit/miss logic 422 determines, after translation of the EA contained in IFAR 430 by ERAT 432 and lookup of the real address (RA) in I-cache directory 434, that the cache line of instructions corresponding to the EA in IFAR 430 does not reside in L1 I-cache 418, then hit/miss logic 422 provides the RA to L2 cache 416 as a request address via I-cache request bus 424. Such request addresses may also be generated by prefetch logic within L2 cache 416 based upon recent access patterns. In response to a request address, L2 cache 416 outputs a cache line of instructions, which are loaded into prefetch buffer (PB) 428 and L1 I-cache 418 via I-cache reload bus 426, possibly after passing through optional predecode logic 402.

Once the cache line specified by the EA in IFAR 430 resides in L1 I-cache 418, L1 I-cache 418 outputs the cache line to both branch prediction unit (BPU) 436 and to instruction fetch buffer (IFB) 440. BPU 436 scans the cache line of instructions for branch instructions and predicts the outcome of conditional branch instructions, if any. Following a branch prediction, BPU 436 furnishes a speculative instruction fetch address to IFAR 430, as discussed above, and passes the prediction to branch instruction queue 464 so that the accuracy of the prediction can be determined when the conditional branch instruction is subsequently resolved by branch execution unit 492.

IFB 440 temporarily buffers the cache line of instructions received from L1 I-cache 418 until the cache line of instructions can be translated by instruction translation unit (ITU) 442. In the illustrated embodiment of core 307, ITU 442 translates instructions from user instruction set architecture (UISA) instructions into a possibly different number of internal ISA (IISA) instructions that are directly executable by the execution units of core 307. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 438 to an instruction group, the members of which are permitted to be dispatched and executed out-of-order with respect to one another. Global completion table 438 tracks each instruction group for which execution has yet to be completed by at least one associated EA, which is preferably the EA of the oldest instruction in the instruction group.

Following UISA-to-IISA instruction translation, instructions are dispatched to one of latches 444, 446, 448 and 450, possibly out-of-order, based upon instruction type. That is, branch instructions and other condition register (CR) modifying instructions are dispatched to latch 444, fixed-point and load-store instructions are dispatched to either of latches 446 and 448, and floating-point instructions are dispatched to latch 450. Each instruction requiring a rename register for temporarily storing execution results is then assigned one or more rename registers by the appropriate one of CR mapper 452, link and count (LC) register mapper 454, exception register (XER) mapper 456, general-purpose register (GPR) mapper 458, and floating-point register (FPR) mapper 460.

The dispatched instructions are then temporarily placed in an appropriate one of CR issue queue (CRIQ) 462, branch issue queue (BIQ) 464, fixed-point issue queues (FXIQs) 466 and 468, and floating-point issue queues (FPIQs) 470 and 472. From issue queues 462, 464, 466, 468, 470 and 472, instructions can be issued opportunistically to the execution units of processor 103 (shown in FIG. 1) for execution as long as data dependencies and antidependencies are observed. The instructions, however, are maintained in issue queues 462-472 until execution of the instructions is complete and the result data, if any, are written back, in case any of the instructions need to be reissued.

As illustrated, the execution units of core 307 include an execution subcomponent 403, which includes a CR unit (CRU) 490 for executing CR-modifying instructions, a branch execution unit (BEU) 492 for executing branch instructions, two fixed-point units (FXUs) 494 and 405 for executing fixed-point instructions, two load-store units (LSUs) 496 and 498 for executing load and store instructions, and two floating-point units (FPUs) 406 and 404 for executing floating-point instructions. Each of execution units 490-404 is preferably implemented as an execution pipeline having a number of pipeline stages.

During execution within one of execution units 490-404, an instruction receives operands, if any, from one or more architected and/or rename registers within a register file coupled to the execution unit. When executing CR-modifying or CR-dependent instructions, CRU 490 and BEU 492 access the CR register file 480, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 482 contains a count register (CTR), a link register (LR) and rename registers of each, by which BEU 492 may also resolve conditional branches to obtain a path address. General-purpose register files (GPRs) 484 and 486, which are synchronized, duplicate register files, and store fixed-point and integer values accessed and produced by FXUs 494 and 405 and LSUs 496 and 498. Note that floating-point register file (FPR) 488, which like GPRs 484 and 486 may also be implemented as duplicate sets of synchronized registers, contains floating-point values that result from the execution of floating-point instructions by FPUs 406 and 404 and floating-point load instructions by LSUs 496 and 498.

After an execution unit finishes execution of an instruction, the execution unit notifies GCT 438, which schedules completion of instructions in program order. To complete an instruction executed by one of CRU 490, FXUs 494 and 405 or FPUs 406 and 404, GCT 438 signals the execution unit, which writes back the result data, if any, from the assigned rename register(s) to one or more architected registers within the appropriate register file. The instruction is then removed from the issue queue and once all instructions within its instruction group have been completed, it is removed from GCT 438. Other types of instructions, however, are completed differently.

When BEU 492 resolves a conditional branch instruction and determines the path address of the execution path that should be taken, the path address is compared against the speculative path address predicted by BPU 436. If the path addresses match, no further processing is required. If, however, the calculated path address does not match the predicted path address, BEU 492 supplies the correct path address to IFAR 430. In either event, the branch instruction can then be removed from BIQ 464, and when all other instructions within the same instruction group have completed executing, from GCT 438.

Following execution of a load instruction, the effective address computed by executing the load instruction is translated to a real address by a data ERAT (not illustrated) and then provided to L1 D-cache 420 as a request address. At this point, the load instruction is removed from FXIQ 466 or 468 and placed in load reorder queue (LRQ) 409 until the indicated load is performed. If the request address misses in L1 D-cache 420, the request address is placed in load miss queue (LMQ) 407, from which the requested data is retrieved from L2 cache 416, and failing that, from another core 307 or from system memory. LRQ 409 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 410 into which effective addresses for stores are loaded following execution of the store instructions. From STQ 410, data can be stored into either or both of L1 D-cache 420 and L2 cache 416.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 307 of FIG. 4, the hard state includes the contents of user-level registers, such as CRR 480, LCR 482, GPRs 484 and 486, FPR 488, as well as supervisor level registers 451. The soft state of core 307 includes both "performance-critical" information, such as the contents of L1 I-cache 418, L1 D-cache 420, address translation information such as DTLB 412 and ITLB 413, and less critical information, such as BHT 435 and all or part of the content of L2 cache 416. Thus, the content of such registers are fixed values that describe a real-time current architecture state register of the processor core 307.

Note that as used to describe core 307 in FIG. 4, L1 denotes lowest level of cache, which is first checked to locate an operand (in the case of a data (D) cache) or data (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment, if an unauthorized attempt is made to access computing device 251 or any other hardware resource as described herein, a core dump from the CPU 203 and/or the processor 216 shown in FIG. 2 will occur, thus preventing the nefarious attacker from accessing the hard/soft states of CPU 203 and/or processor 216. A core dump includes a recorded state of memory being used by an application (e.g., application 204) at the time of the attack. The core dump includes contents of a program counter, stack pointer, OS flags, etc. In one embodiment, the core dump specifically includes contents of the L1 instruction cache 418, the L1 data cache 420, the L2 cache 416, the CRR 480, LCR 482, GPR 484, and/or FPR 488 depicted and described in FIG. 4. Thus, the content of the core dump contains the "hard" state and/or the "soft" state of the core, as described/defined above.

In one embodiment of the present invention, the decoded/decrypted data is loaded directly into the L1 D-cache 420 depicted in FIG. 4, thus bypassing the LSU 496/498, STQ 410, etc. In one embodiment, the decrypted data 305 is sent to the L2 cache 416, depicted in FIG. 4, from which it is dispatched to the respective execution units.

Returning now to FIG. 2, as described above, security computer 201 is a server/service (e.g., computer 101 depicted in FIG. 1) that, among other functions, creates the security object 208. In one embodiment, each security object is specific for particular data. That is, a first security object may be designed to decrypt a first protected data; a second security object may be designed to decrypt a second protected data; etc. This allows a fine level of granularity for controlling which protected data can be decrypted/enabled for use by a server and/or a client.

Note again that in FIG. 3, in one embodiment the protected data 210 is unusable until it is inside of the processor 216, where it is converted into its usable form using the security object 208. This ensures that the use of the protected data 210 cannot occur without the use of the security object 208, which use must occur inside of (within) the processor 216.

Figure 5:
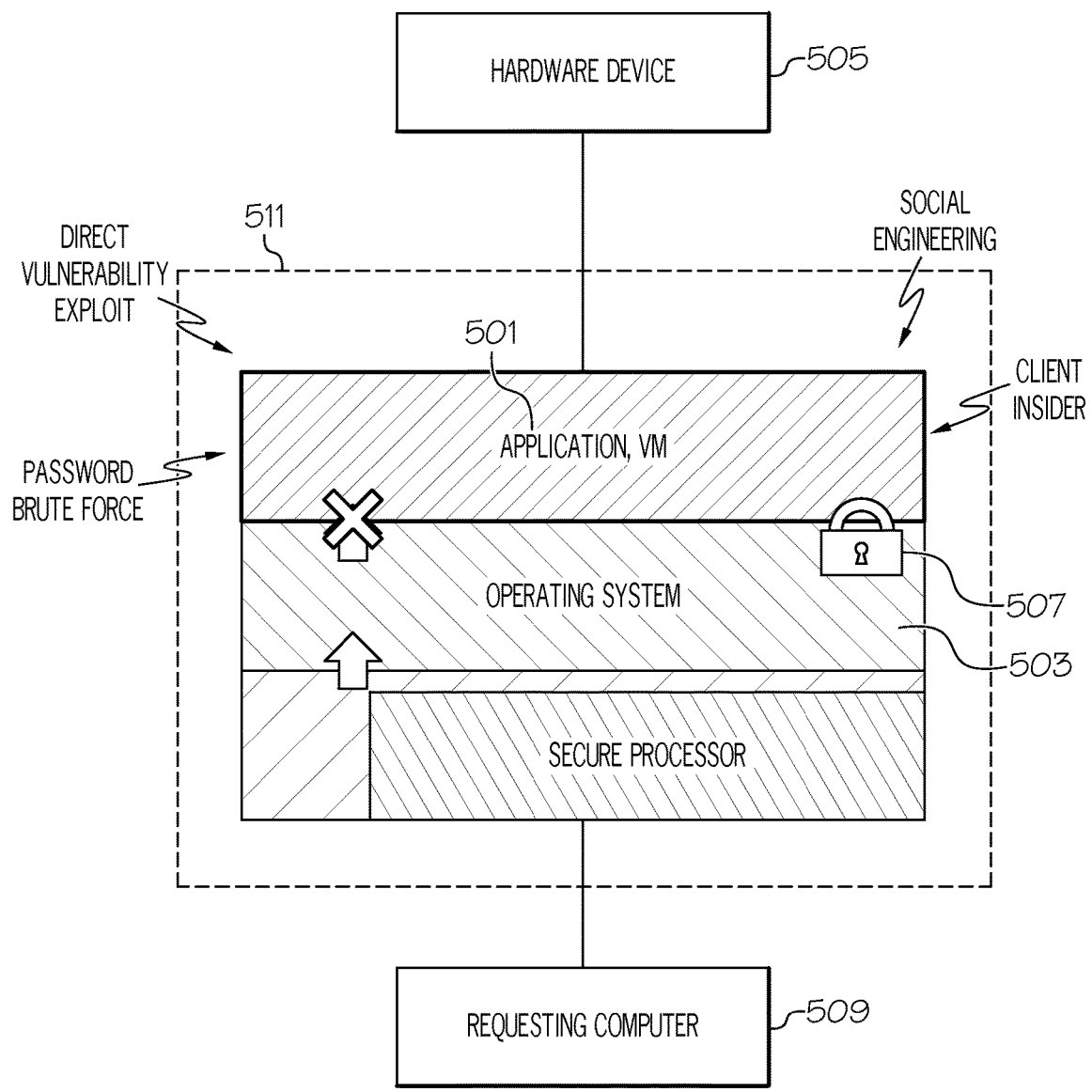
FIG. 5 depicts a relationship between a secure processor, an operating system, and an application within a security computer or other systems that control access to hardware resources.

Thus, the present invention utilizes the secure processor 216 depicted in FIG. 3 to protect various resources. As depicted in FIG. 5, such a secure processor 516 (analogous to secure processor 216 shown in FIG. 3) protects applications, virtual machines, etc. (depicted as resources 501) by requiring access to resources 501 to go through the secure processor 516, which controls access to operating system 503 that is needed to access applications and virtual machines, which are used to access hardware devices such as hardware device 505. In order to enable the operating system 503, the secure processor 516 must receive a key (e.g., a private key) from the requesting computer 509. In one embodiment, the secure processor 516, operating system 503, and resources 501 are all part of a security computer 511, such as the security computer 201 depicted in FIG. 2. In one embodiment, the secure processor 516, operating system 503, and resources 501 are all part of a peripheral security system, such as the computing device 604 shown in FIG. 6, or the legacy sensor access system 703 and/or the secure sensors 704 shown in FIG. 7.

Figure 6:
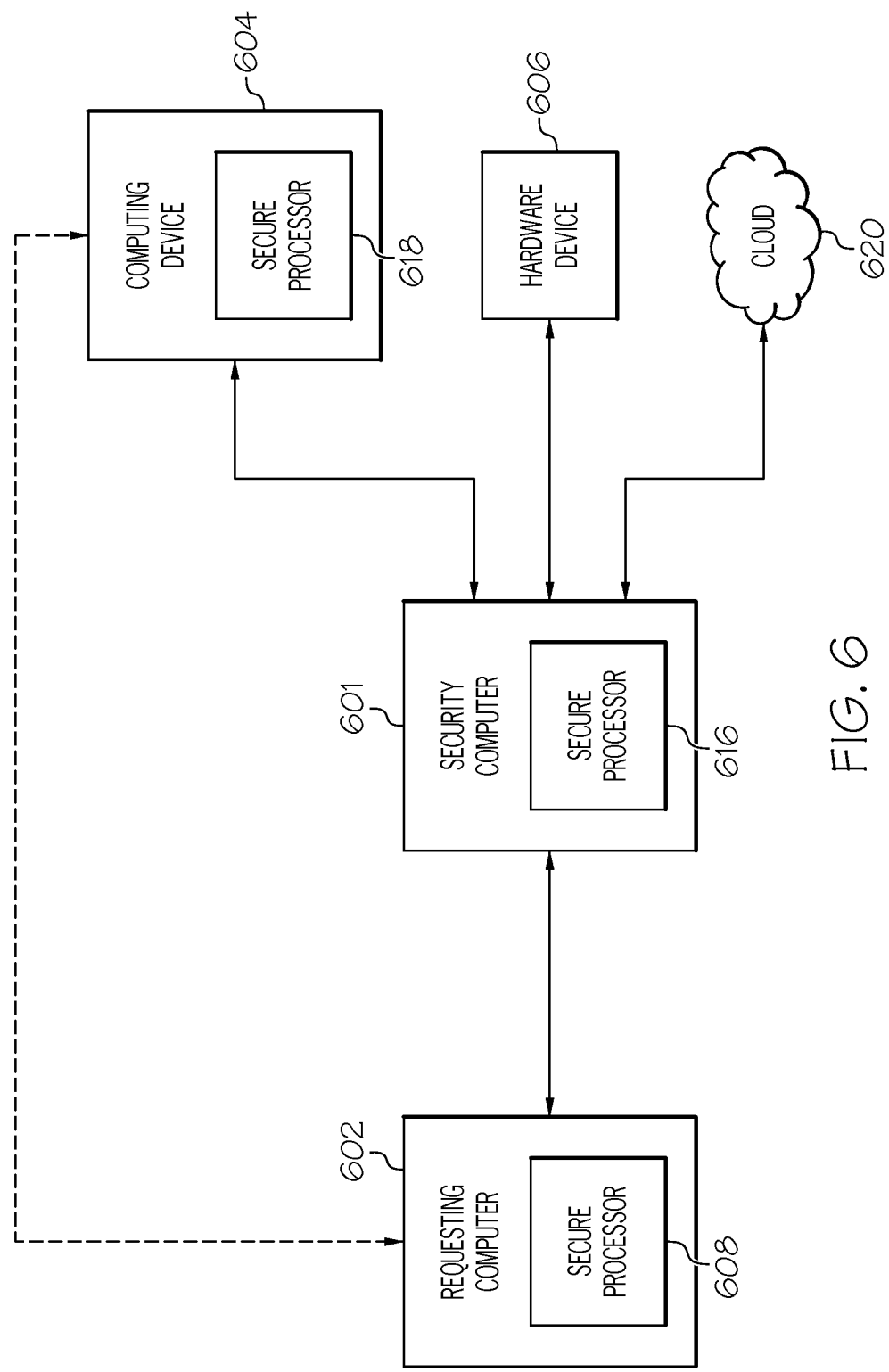
FIG. 6 illustrates additional detail of a relationship between a requesting computer, a security computer, and hardware devices.

For example, consider FIG. 6, in which a requesting computer 602 is requesting access to a computing device 604 and/or a hardware device 606 (e.g., a non-computing device). In order to access computing device 604 and/or hardware device 606, the requesting computer 602 must go through the security computer 651, which is equipped with a secure processor 616 (analogous to the secure processor 216 described in FIG. 3).

In order to ensure that access by the requesting computer 602 to computing device 604 and/or hardware device 606 and/or a cloud 620 (e.g., network of shared hardware and/or software resources) is secure, a secure processor 608 (analogous to the secure processor 216 described in FIG. 3) within the requesting computer 602 encrypts a request for a resource, such as computing device 604, hardware device 606, cloud 620, etc. The secure processor 616 in the security computer 601 first decrypts the encrypted request from the requesting computer 602, and then re-encrypts the request coming from requesting computer 602 (e.g., through the use of a core such as core 307 shown in FIG. 3). This encrypted request is then passed on to computing device 604, which also includes a secure processor 618 (analogous to the secure processor 216 described in FIG. 3). Computing device 604 is only able to decrypt encrypted information coming from security computer 601, and not from requesting computer 602. This restriction is ensured by requiring secure processor 616 and secure processor 618 to have the same hardware architecture, and by security computer 601 sending an encrypted identifier for the security computer 601, which lets the computing device 604 know that the encrypted information came from the security computer 601.

The encrypted information going from the security computer 601 to the computing device 604 includes an identification of the requesting computer 602, the address (e.g., Internet protocol—IP address or media access control—MAC address) of the requesting computer 602, as well as what resources (e.g., applications, storage, etc.) are being requested of the computing device 604. The computing device 604 can then establish a session with the requesting computer 602 (preferably) via the security computer 601, or alternatively directly with the requesting computer 602 (as indicated by the dashed lines).

Figure 7:
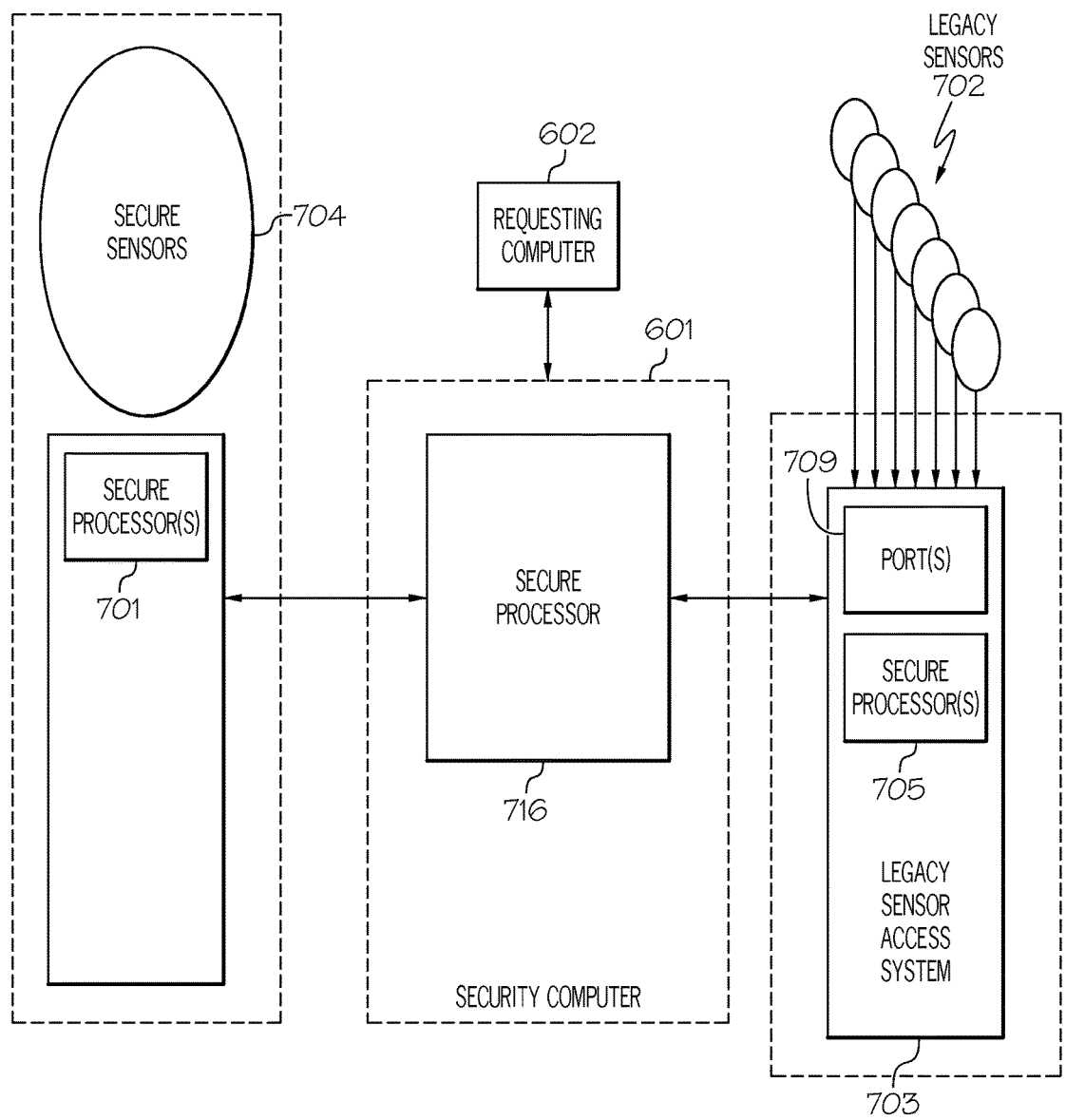
FIG. 7 depicts a legacy access system that provides secure access to legacy hardware devices.

With respect now to FIG. 7, assume that requesting computer 602 is requesting access to a non-computing hardware device 606, such as the depicted legacy sensors 702 and/or secure sensors 704. Sensors may be any type of hardware sensor, including environmental sensors (e.g., thermometers, pressure gauges, accelerometers, etc.), or they may monitor equipment (e.g., tachometers for rotating equipment, CPU monitors and/or bus monitors that monitor activities within a computer, etc.)

Rather than directly accessing these hardware sensors, requesting computer 602 must go through the security computer 601 and its secure processor 716, which provides secure cryptographic services as described above. If equipped with their own secure processor(s) 701, then secure processor 716 communicates with the secure sensors 704 through the secure processor(s) 701. If the sensors are legacy sensors 702 (which were not built with internal secure processors), then the secure processor 716 will communicate with a legacy sensor access system 703, which has secure processor(s) 705 with which the secure processor 716 in the security computer 601 communicates.

As shown in FIG. 7, when the legacy sensor access system 703 receives an encrypted request from the security computer 601 to access the legacy sensors 702, the encrypted request is first decrypted by the secure processor(s) 705. If successful (e.g., the legacy sensor access system 703 has the requisite secure processor hardware, private key 206, security object 208, etc.), then a port (e.g., switch, connector, etc.) is opened, allowing the legacy sensors 702 to communicate with the security computer 601, and thus the requesting computer 602, via the legacy sensor access system 703.

While the hardware devices depicted in FIG. 7 are sensors, other hardware devices that can utilize the same architecture depicted in FIG. 7 include, but are not limited to, actuators, rotating equipment, pressure vessels, refinery equipment, drilling equipment, etc. Thus, the present invention prevents unauthorized access to, and thus nefarious control over, such equipment.

Figure 8:
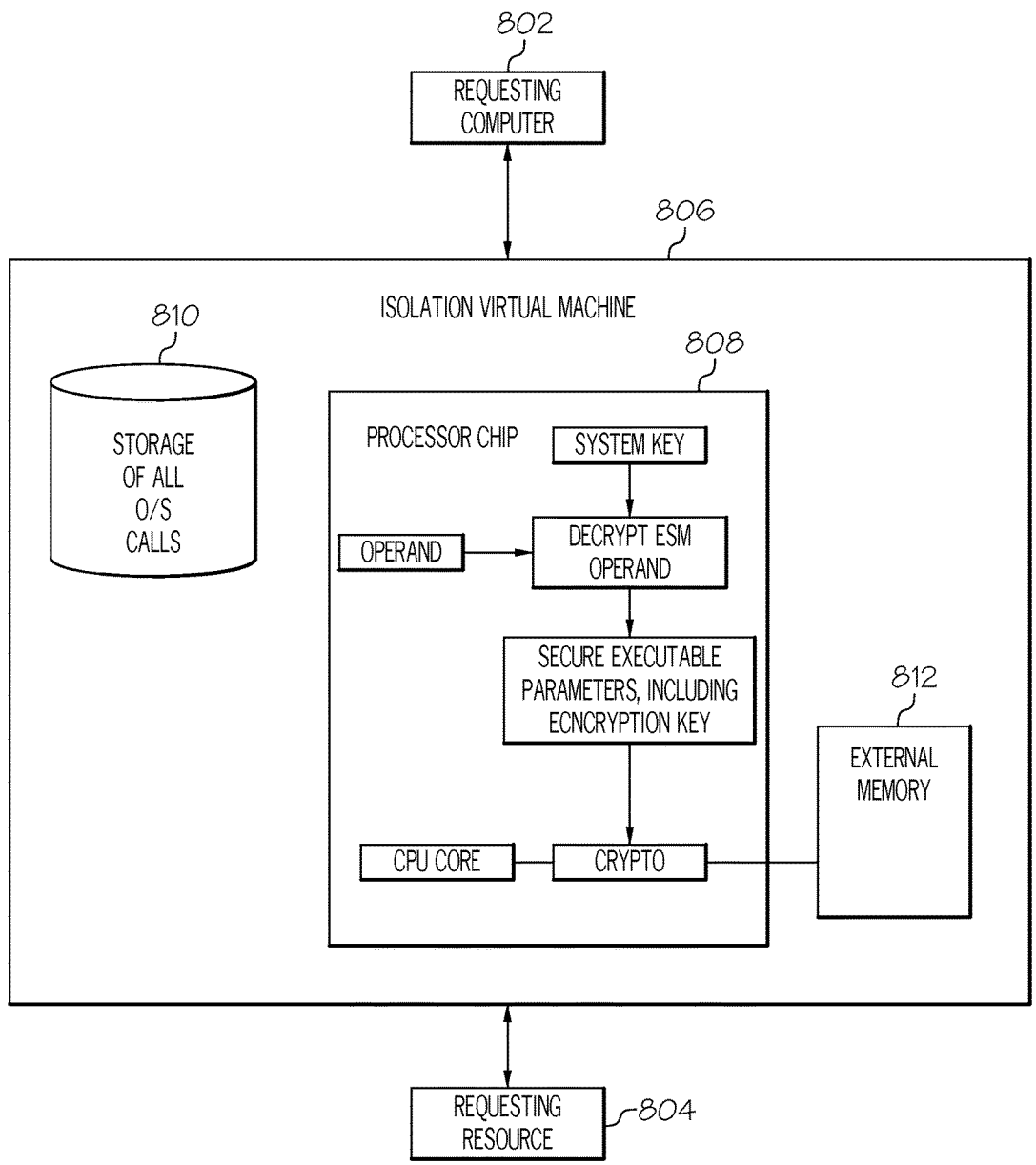
FIG. 8 illustrates an isolation virtual machine that is used in one or more embodiments of the present invention.

As depicted in FIG. 8, in one embodiment of the present invention all requests from a requesting computer 802 for a requested resource 804 go through an isolation virtual machine 806. Isolation virtual machine 806 utilizes a secure processor chip 808, which has the same capabilities at those described above for secure processor 616. However, isolation virtual machine 806 provides an extra layer of protection since it is virtual, and thus is a collection of hardware and software resources that are used to construct the isolation virtual machine 806.

As with other secure processors, all encryption/decryption (i.e., cryptographic activities) are confined within the secure processor chip 808, such that only encrypted data is allowed to pass to external memory 812. Furthermore, isolation virtual machine 806 captures all system messages (e.g., to and from the requesting computer 802 as well as the requested resource 804), thus allowing the isolation virtual machine 806 to react like it actually processed the transactions but not interact with the physical world.

Assume that a program (the requested resource or the program used to access another device) has been altered by a third party who does not know the private key needed to securely communicate with the secure processor chip 808. If even one bit in the private key is changed, the program will fail. When this occurs, the isolation virtual machine 806 stores the errant system message in storage 810, which allows for forensic investigation and follow up interventions. Similarly, the isolation virtual machine 806 is able to check crypto keys of transactions, in order to ensure that they are correct before being sent to the processor chip 808's crypto circuitry.

Figure 9:
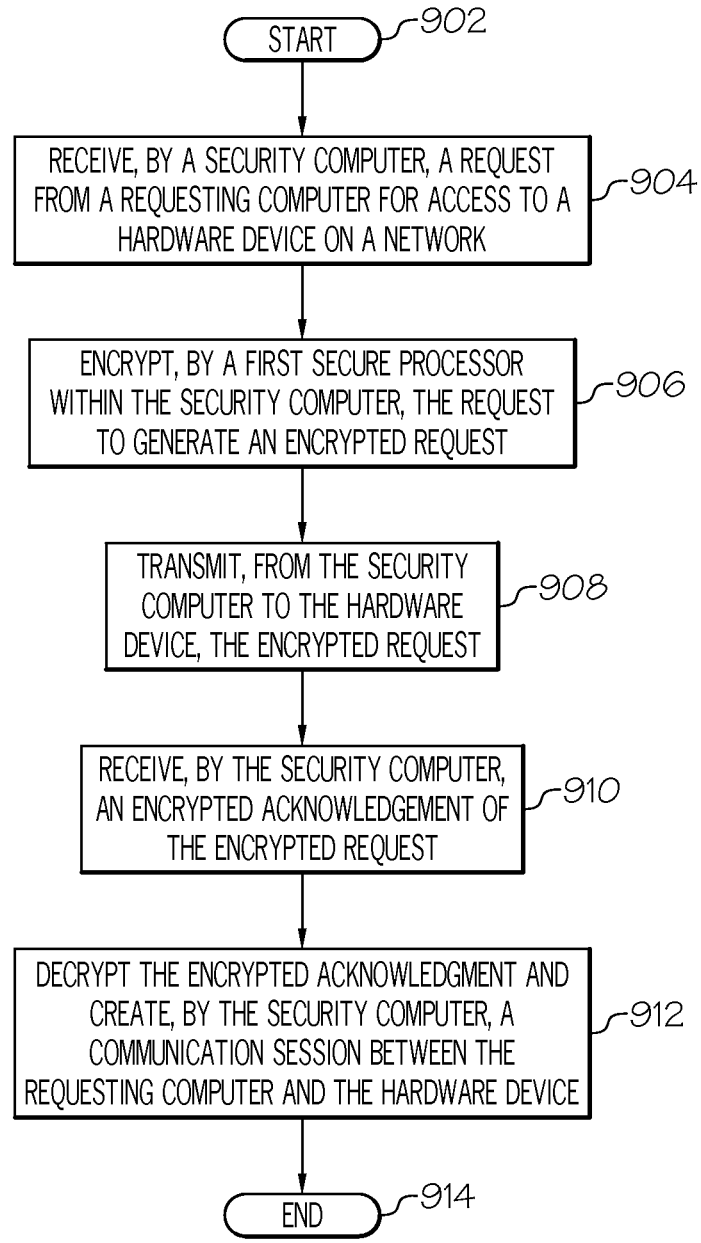
FIG. 9 is a high-level flow chart of exemplary steps taken by one or more processors to protect access to hardware devices through use of a secure processor.

With reference now to FIG. 9, a high level flow chart of one or more processes performed by one or more processors and/or other hardware to protect access to hardware devices through use of a secure processor is presented.

After initiator block 902, a security computer (e.g., security computer 601 shown in FIG. 6) receives a request from a requesting computer (e.g., requesting computer 602 shown in FIG. 6) for access to a hardware device (e.g., computing device 604, hardware device 606, and/or cloud 620 shown in FIG. 6) on a network (e.g., network 127 shown in FIG. 1), as described in block 904.

As described in block 906, a first secure processor within the security computer encrypts, in response to receiving the request, the request from the requesting computer to generate an encrypted request. As described herein the encrypted request is generated within a core of the first secure processor. As also described herein, only encrypted data is permitted to exit the core of the first secure processor, such that there is no access to unencrypted data and/or unencrypted application instructions that are needed to access the requested hardware device outside of the core. In one or more embodiments, the first secure processor protects a secure application used to process the request from other software on the first secure processor, as described herein.

As described in block 908, the security computer transmits the encrypted request to the hardware device. Although encrypted, the encrypted request includes an address and identification of the requesting computer.

As described in block 910, the security computer then receives an encrypted acknowledgement of the encrypted request. This encrypted acknowledgement was generated by a processor (e.g., secure processor 618 shown in FIG. 6) that is associated with the hardware device (e.g., computing device 604).

As described in block 912, in response to receiving the encrypted acknowledgement, the security computer decrypts the encrypted acknowledgement, and then creates a communication session between the requesting computer and the hardware device.

The flow chart ends at terminator block 914.

Thus, the invention provides additional protection to hardware devices on a network through the use of secure processors, which are unable to be "hacked", since all encryption and encrypted data/applications remain within the secure processors.

In one embodiment of the present invention, access to the hardware device is established by an application. For example, as shown in FIG. 5, in order to access hardware device 505, the secure processor 516 must first authorize the enablement of the operating system 503. Once this is achieved, the operating system can then unlock the lock 507, which may be a flag, portal, or other communication system between the operating system 507 and the application/VM depicted as resources 501. Only when this flag/portal/communication is enabled will the application/VM be enabled, thus affording access to the hardware device 505 whose access is controlled by the application/VM. In order to enable the operating system, an encrypted private key needed by the first secure processor to access an operating system must be provided (e.g., by the requesting computer

509 shown in FIG. 5). that is required to execute the application that accesses the hardware device. This multi-step process (i.e., providing the secure processor with a key, enabling the operating system, enabling the application/VM, and requiring access to the hardware device be under the control of the application/VM) provide further layers of protection for the hardware device not found in the prior art.

In one embodiment of the present invention, the hardware device is a hardware sensor or a hardware actuator. The security computer accesses a legacy sensor/actuator access system (e.g., legacy sensor access system 703 shown in FIG. 7) with the encrypted request for access from the requesting computer. The legacy sensor/actuator access system has a third secure processor (e.g., secure processor(s) 705 shown in FIG. 7). This third secure processor decrypts the encrypted request to open a port between the legacy sensor/actuator and the security computer. This legacy device (sensor/actuator/etc.) access system thus provides additional protection of the hardware device(s) not found in the prior art.

The secure processor(s) described herein provides verifiably, secure applications. The architecture protects the confidentiality and integrity of information in an application so that "other software" cannot access that information or undetectably tamper with it. In addition to protecting a secure application from attacks from "outside" the application, the architecture also protects against attempts to introduce malware "inside" the application via attacks such as buffer overflow or stack overflow attacks. This architecture provides a foundation for providing strong end-to-end security in a network or cloud environment.

The architecture provides two features.

First, information is "in the clear" when it is inside the CPU chip (of the secure processor) but encrypted whenever it is outside the chip. This encryption protects the confidentiality and integrity of code and data from physical probing or physical tampering.

Second, the architecture of the secure processor uses "fine-grained" crypto protection that also protects the confidentiality and integrity of information in an application from all the other software on a system. It does this in a way that is largely transparent to applications.

Figure 10:
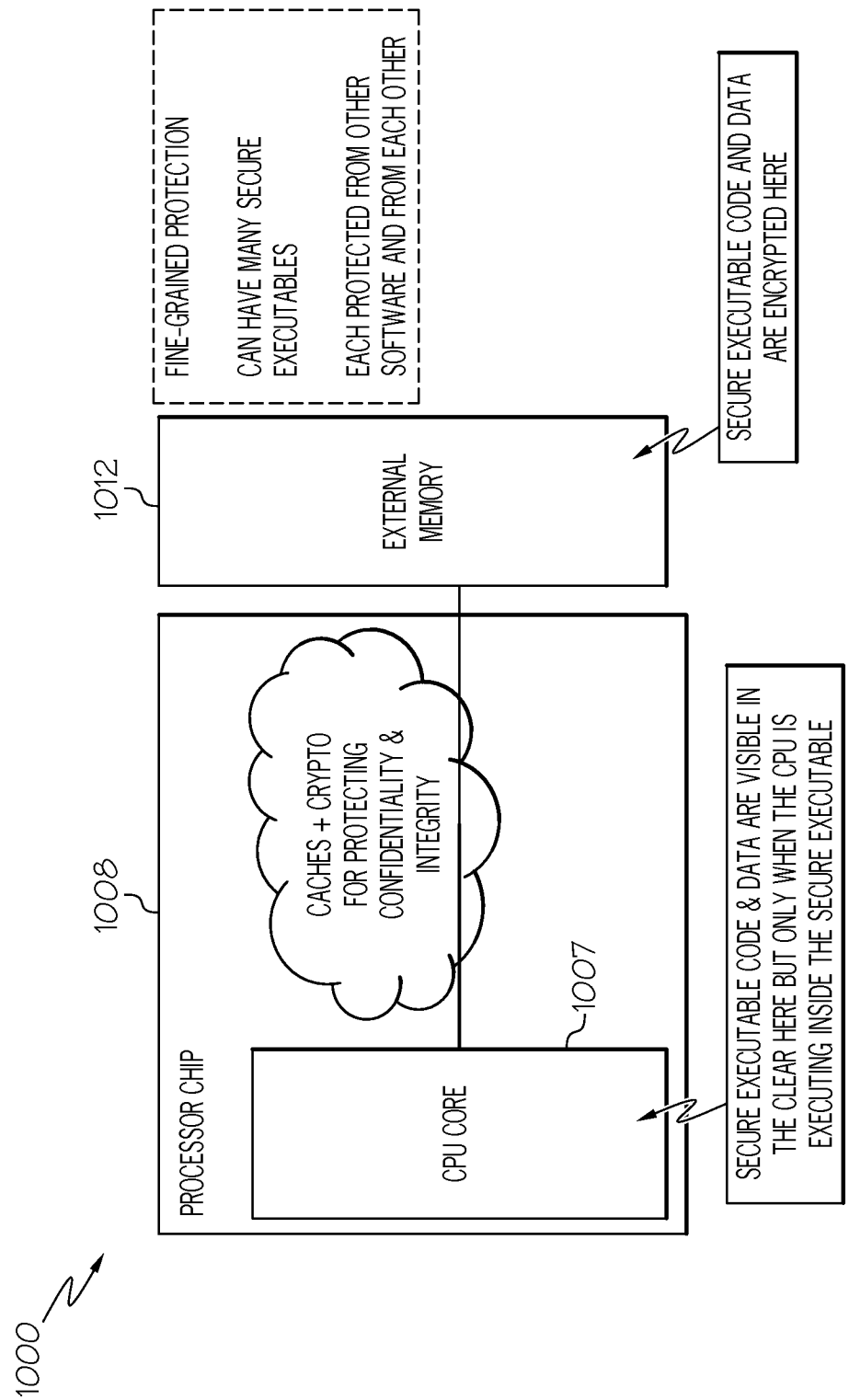
FIG. 10 depicts another view of a secure processor used in one or more embodiments of the present invention.

With reference now to FIG. 10, additional detail of an embodiment of a secure processor used in accordance with one or more embodiments of the present invention.

The secure processor chip 1008 shown in FIG. 10 provides fine-grained crypto protection to protect information in one program from other software (including privileged software like an operating system, device drivers or malware that obtains root privileges). The secure processor chip 1008 protects confidentiality and integrity of information so other software cannot read such information or undetectably tamper with such information.

When an application's information is outside the CPU core 1007 (e.g. when the application is in the file system prior to execution; or when it is in memory or in the paging system during execution) it is encrypted under keys that are not available to any other software and an integrity tree is used to detect tampering. Integrity protection (as well as confidentiality protection) is continuous—not just at application launch time. When an application's information is inside the CPU (e.g. in on-chip caches), it is in the clear but context labels prevent other software from accessing or tampering with that information.

Since an application's information is encrypted whenever it is outside the CPU and since other software cannot access an application's cleartext information inside the CPU, other software such as the page demon or malware can only see the encrypted form of an application's information. Thus an application's information is protected from all the other software on the system including privileged software like the operating system, device drivers or applications running with root privileges—or malware that obtains root privileges by exploiting a vulnerability in privileged software.

Unlike systems that "measure" boot code, operating system code and device driver code at system boot time and then trust this code during execution, in the architecture of the secure processor chip 1008, an application does not need to trust the operating system or any other software. An application in the secure processor chip 1008 system uses operating system services for scheduling, paging, I/O, interrupt handling etc., but it does not trust the operating system with any sensitive information. This is analogous to the way users use the Internet today when they make an online purchase via https. Such users use the Internet to transport packets but they do not give access to any sensitive information. A malicious network operator may delay or drop the packets, but it cannot violate the confidentiality or integrity of the packets.

The system 1000 depicted in FIG. 10 thus minimizes the amount of code that needs to be trusted. The system 1000 provides a high level of confidence that information in an application is secure without having to trust millions of lines of operating system, device driver and boot code or other applications. The only code that an application needs to trust is the code within the application itself.

As discussed above, the information in an application is cryptographically protected when the application is in a file system as well as throughout execution. This information is also protected while the application is in-transit prior to installation in the file system. Since the information in an application is always protected, the system can "compile in" a root (or roots) of trust that cannot be stolen or tampered with. Since a "compiled in" private key can't be stolen, the system provides strong protection against key theft and identity spoofing. And since a "compiled in" digital certificate cannot be tampered with, the system provides strong protection for a chain of trust that allows it to determine the authenticity of other entities in a network. These roots of trust are protected from 1) an adversary that has root access to the system or 2) a malware-infected operating system.

Secure Applications (i.e., Secure Executables)

In the architecture of the secure processor(s) described herein, a secure application consists of 1) a cryptographically protected region containing encrypted code and data, 2) an initial integrity tree that protects the integrity of the protected region and 3) an unprotected region that includes "communication" buffers and a loader that includes a new CPU instruction. The new instruction, 'esm', causes the CPU to 'enter secure mode' and process the encrypted code and data. Encrypted code and data is decrypted and checked for integrity in hardware as it is brought into the CPU chip (i.e. into an on-chip cache) from external memory; and data is encrypted and integrity tree values are updated as information (i.e. dirty cache lines) are written out to external memory. The operand of the esm instruction, which includes the key for accessing the encrypted code and data as well as the initial value for the root of the integrity tree, is itself protected by a 'system key' that is not available to any software.

Thus other software, such as 'memory scraping' malware cannot access or undetectably tamper with information in a secure application. (The esm operand is protected by a public/private key pair. The build machine encrypts the esm operand with the public key of the target machine. The private key, which might be installed in the target machine at manufacture time, is used by the esm instruction at run-time to decrypt the operand.) In addition to loading the application's encryption key and integrity root into the crypto hardware, the esm instruction also allocates an ID, the Executable-ID or EID, that the hardware and the operating system will use to refer to this 'secure executable'.

Figure 11:
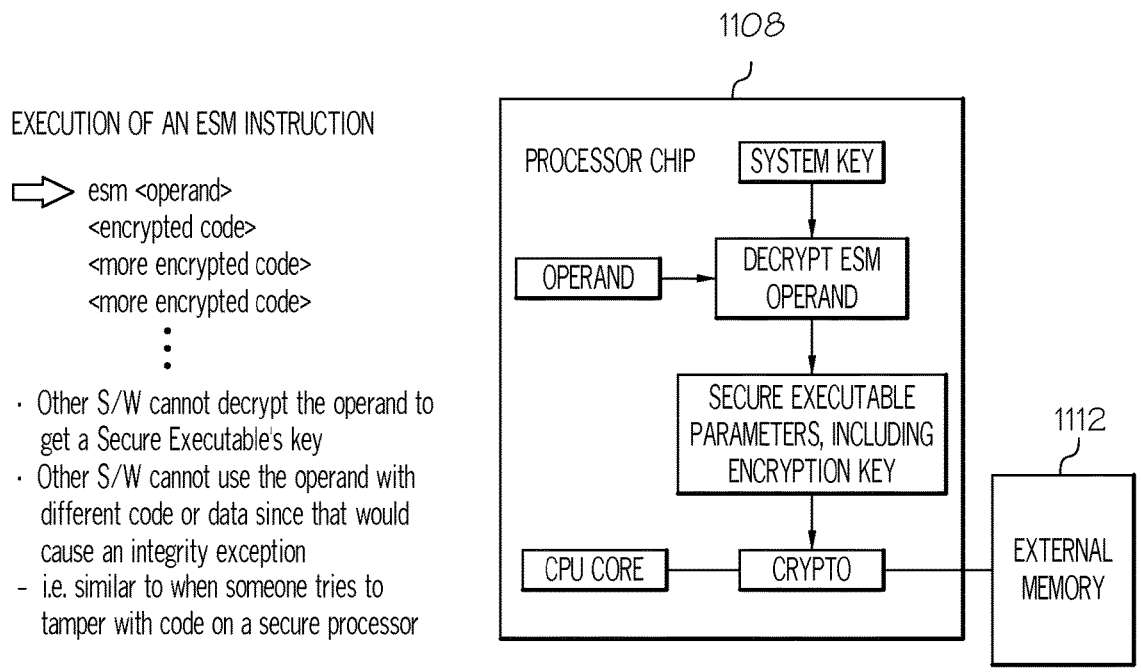
FIG. 11 illustrates detail of execution of a secure mode instruction using a secure processor in accordance with one or more embodiments of the present invention.

With reference now to FIG. 11, details of execution of a secure mode instruction using a secure processor in accordance with one or more embodiments of the present invention is presented showing a relationship between a secure processor chip 1108 and an external memory 1112. As shown in FIG. 11, the esm instruction is used to Enter Secure Mode & load crypto keys. A Secure Executable's keys are not "in the clear" in its ESM instructions. Rather, they are protected under a "system key" that is not available to other software.

As discussed above, information is stored in the clear in on-chip caches so cryptographic operations only occur when information moves between on-chip caches and external memory. In similar fashion, the checking and updating of integrity values only occur when information moves between on-chip caches and external memory. Thus the cryptographic and integrity overhead is close to 0 when a secure application is getting cache hits.

Using the Operating System Without Trusting the Operating System

As discussed above, a secure application (or secure executable) uses operating system services but does not trust the operating system with any sensitive information.

In the paging subsystem for example, the operating system moves an application's pages between memory and disk but the pages are encrypted and the operating system has no access to the encryption key(s).

Figure 12:
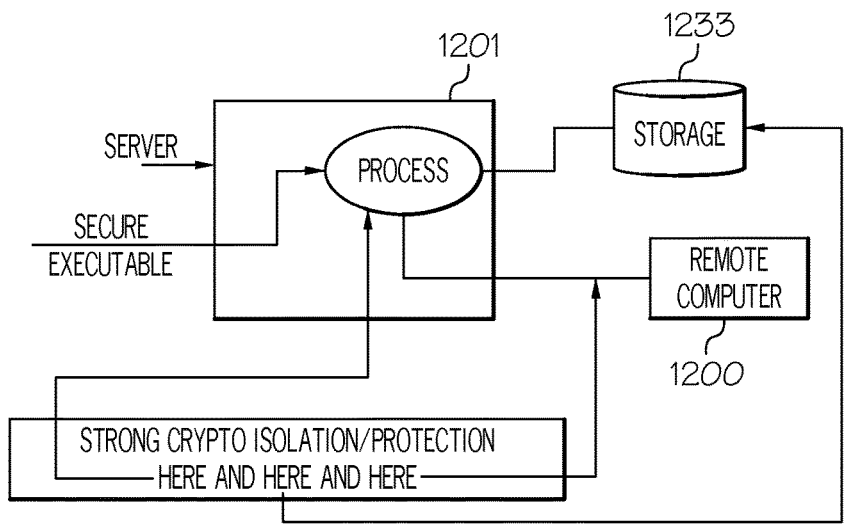
FIG. 12 depicts an end-to-end protection of sensitive information using a secure processor in accordance with one or more embodiments of the present invention.

Another example is in network I/O, as shown in FIG. 12 in which a packet is sent from a remote computer 1200 to a server 1201, which has access to a storage device 1233. An application uses buffers in the unprotected region to send packets to and receive packets from a remote system. Since these buffers are in the unprotected region, they are not protected by the on-chip crypto. Thus the operating system and the remote system "see" the same information that the secure application "sees". On the other hand, if the contents of a buffer are cryptographically protected by the secure processor's crypto protection, the operating system and the remote system would not be able to "see" the content that the secure application "sees".

Since the CPU decrypts information that moves from a protected region in external memory into the CPU and since the CPU does not encrypt information that moves from the CPU to an unprotected region in external memory, the act of copying information from the protected region to the unprotected region has the effect of decrypting the information. Information in this region can be sent to a remote system and the remote system will be able to read it. Similarly the act of copying information from the unprotected region to the protected region has the effect of encrypting it under the secure application's encryption key. This is useful when information is received from a remote entity.

Note that although the unprotected region is not protected by the secure processor's encryption, information in that region can still be cryptographically protected. Standard communications security mechanisms such as secure socket layer (SSL) or transport layer security (TLS) can be used to provide end-to-end security. If a message that is to be sent to a remote system is encrypted under TLS before it is moved into the unprotected region, the message will be protected in the unprotected region in the same way that it is protected while it is traveling across a network. If, at the receiving end, the message is moved to the protected region before the TLS decryption, the message will have strong protection end-to-end with no point of vulnerability along the way.

Note that the keys that a secure application uses for TLS or other communications security will be protected so other software including the operating system will not be able to access those keys or the packets protected by those keys, or undetectably tamper with either the keys or the packets. Keys inside a secure application can also be used to protect information stored in a file system, and other software including the operating system will not be able to access those keys or the contents of the files protected by those keys.

System call "wrappers" can be linked with a secure application so that the application does not need to know about the protected and unprotected regions. These "wrappers" are library functions that invoke the actual system calls and copy the contents of buffers between the protected and unprotected regions in a way that is transparent to the application while allowing the application to communicate intelligibly with remote systems.

In addition to hiding some complexity from the programmer, the wrappers also allow the system to convert an existing application into a secure application in a way that is largely transparent to the application program.

As discussed above, the operating system, device drivers and other software do not have access to a secure executable's information. When a secure executable is interrupted, the CPU hardware securely saves certain information before the OS or device drivers get control including the contents of the general purpose registers and the secure executable's encryption key and integrity root. When the operating system gets control, it has no access to any of this information (or the contents of the secure executable's cryptographically protected 'protected region') but it does have access to the EID of the secure executable that was interrupted—which is available in a (new) register. The operating system uses a new instruction, restorecontext, to securely restore and dispatch a previously suspended secure executable. The operand of this instruction is the EID of the secure executable to be dispatched.

Software Build Process

The make process for a secure executable/secure application does not require any changes to programming languages, compilers or link-editors. An application is compiled in the usual manner and then linked with the wrappers discussed above and with a loader that includes the esm instruction (with a placeholder for the esm operand). An integrity tree is built for the code and data that will comprise the protected region and the protected region is then encrypted with a randomly generated symmetric key. The symmetric key and the root of the integrity tree are then encrypted under the public key of the target system to form the operand of the esm instruction. Finally, the integrity tree is combined with the protected region and the loader to form the complete secure executable binary.

Protection From "Attacks From the Inside" Such as Stack and Buffer Overflow

As discussed above, the secure processor can protect the confidentiality and integrity of information in an application from "external attack" so that "other software" (even other software within a the secure processor) cannot access or undetectably tamper with information inside the application.

It can also protect an application from an "internal attack" in which an attacker attempts to exploit a vulnerability in an application's interfaces to get the application to execute code of the attacker's choosing via a software attack such as a buffer overflow or stack overflow attack.

As discussed above, the esm instruction enables the use of cryptographic hardware that protects the confidentiality and integrity of information in an application from "external attack". The esm instruction also establishes the address range that will be protected by the cryptographic hardware. As discussed previously, some portions of the address space (e.g. communication buffers) are not cryptographically protected.

To protect against attacks such as stack overflow and buffer overflow, the esm instruction will also set up two additional address ranges for an application. One of these will tell the CPU hardware that the address range corresponding to the application's code is, from the application's perspective, "read-only". The other will tell the hardware that the address range corresponding to the application's data, stack and heap is "no-execute". Thus if an attacker attempts to exploit a bug in an application so that the application will attempt to write into the code region or execute instructions from the data region, the attempt will fail.

As in the case of the encryption key and integrity root registers, the address range registers will be set by the CPU hardware in the execution of the esm instruction. These registers will not be accessible to software and they will be saved and restored by the CPU hardware during a context switch along with the encryption key and integrity root registers.

Protection Options

As discussed previously, the secure processor can protect the confidentiality and integrity of an application's code and data. But other options are possible. While the integrity of code and data will always be important, in some cases one may not need or want cryptographic confidentiality protection—for code or for data. In various embodiments of the present invention, the secure processor is designed so that the integrity of code and data is protected in all secure executables; the confidentiality of data is protected in secure executables that require that protection; and/or the confidentiality of code is protected in secure executables that require that protection.

Depending on application requirements and "make flags", in one or more embodiments secure executables are built with various combinations of protection. The particular combination that would be used for a given secure executable would be communicated to the CPU via the esm operand.

Deployment Considerations for Secure Executables

The esm operand of a secure executable is encrypted using the system key of the target machine. This adds some complexity to the process of building and distributing software since different target machines will normally have different system keys. In one embodiment, the build machine builds a unique binary for each target machine. Alternatively the build machine builds and sends a single binary to all the targets. This approach would leverage a special Deployment Server (DS) process on the target machine.

The DS would itself be a secure executable that protects sensitive information—including software that it receives from a build machine.

The build machine would compile and link the software that will comprise a secure executable and securely send the software to the DS process on the target machine via standard communications security mechanisms such as SSL or TLS.

The DS will generate an encryption key for the received software and encrypt the software under this key. It will then encrypt the esm operand, which includes this encryption key and the initial integrity root, under the system key of the target system.

Thus the transmitted secure executable software is protected by standard communications security mechanisms until it is safely inside the DS secure process and it will be protected inside the DS process until it has been encrypted and customized for the particular target machine.

Once the received software and its esm operand have been encrypted, the received software is a secure executable that can be safely installed in the file system.

Thus the software is always protected from the time it leaves the build machine until it is safely installed in the file system on the target machine with no point of vulnerability along the way.

In one embodiment, the DS could uses digital certificates or public keys to validate a digital signature on received software to ensure that any software received is from a legitimate trusted party. Since the DS process is itself a security executable, the integrity of these digital certificates or public keys is protected from tampering.

Similarly, embodiments of the present invention that use secure executable mechanisms and digital certificates on the build machine allow the build machine to validate the trustworthiness of the hardware of the target machine.

Thus, the secure processor described herein presents an innovative secure processor architecture that provides for verifiably, secure applications. The architecture protects the confidentiality and integrity of information in an application so that 'other software' cannot access that information or undetectably tamper with it. In addition to protecting a secure application from attacks from "outside" the application, the architecture also protects against attempts to introduce malware "inside" the application via attacks such as buffer overflow or stack overflow attacks.

This architecture minimizes the amount of code that needs to be trusted. An application uses operating system services but does not trust the operating system or device drivers with sensitive information. The architecture allows the system to know with a high level of confidence that information in an application is secure without having to trust millions of lines of operating system, device driver and boot code or other applications. The only code that an application needs to trust is the code within the application itself.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
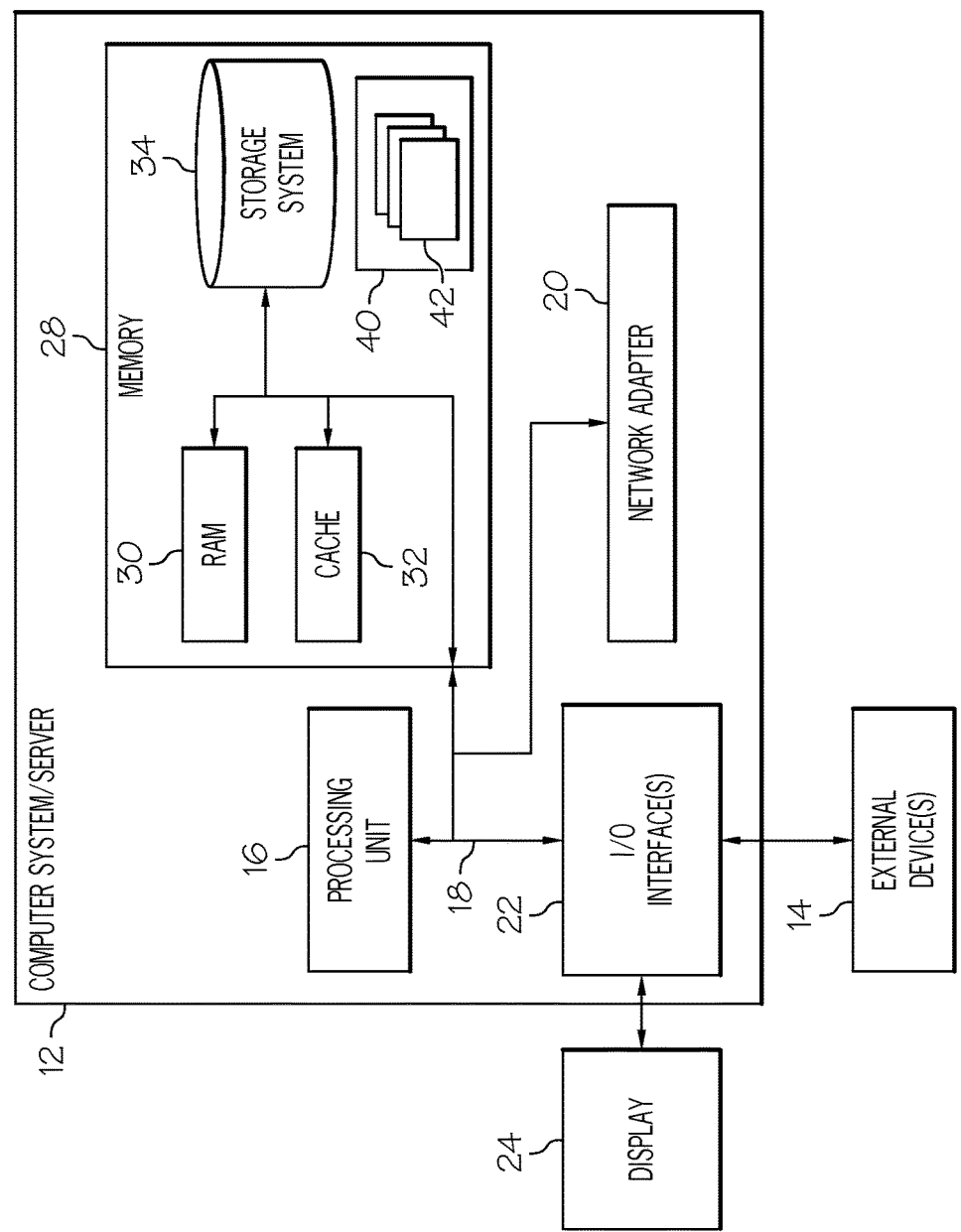
FIG. 13 depicts a cloud computing node according to an embodiment of the present disclosure.

Referring now to FIG. 13, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 14:
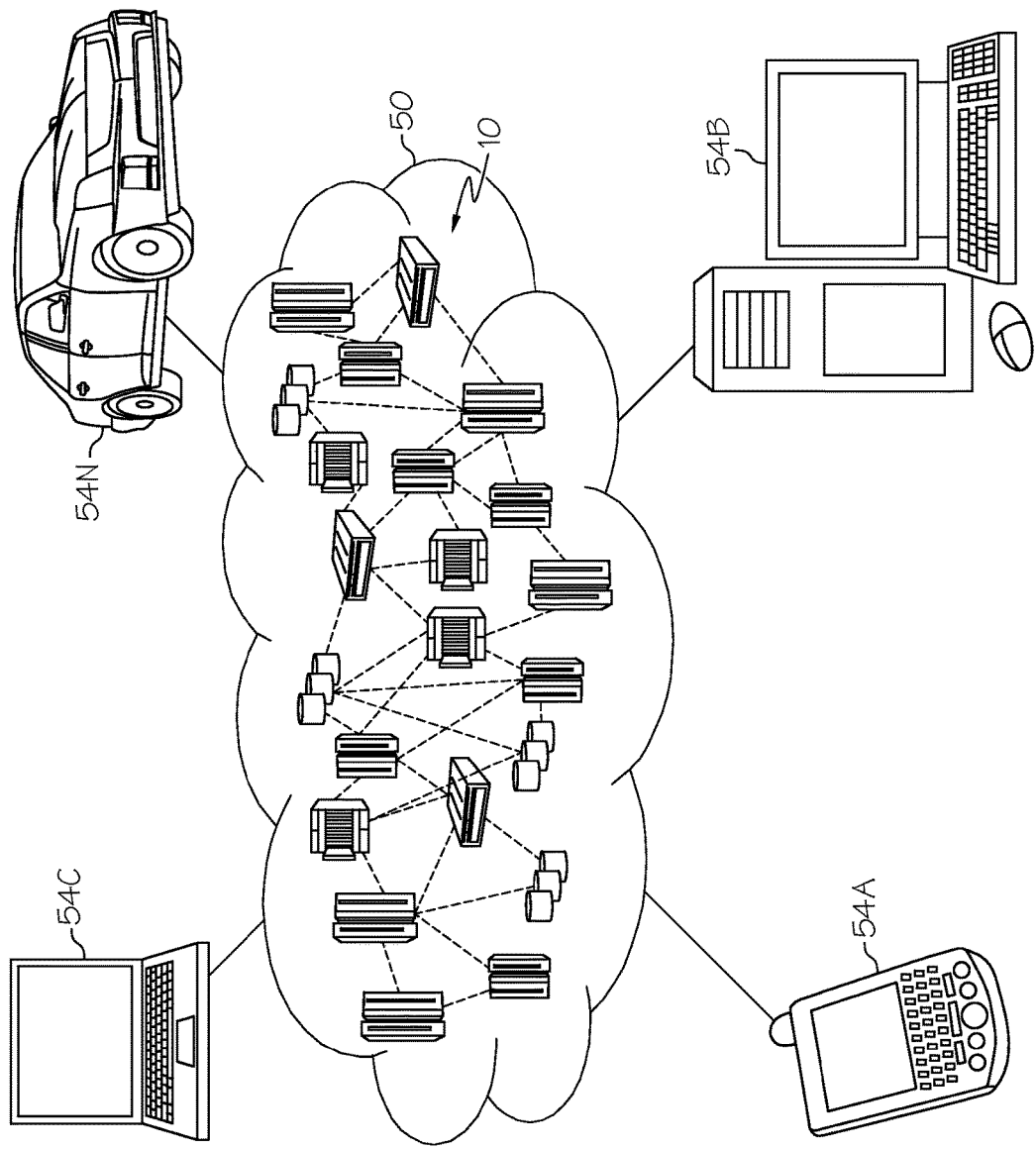
FIG. 14 depicts a cloud computing environment according to an embodiment of the present disclosure.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
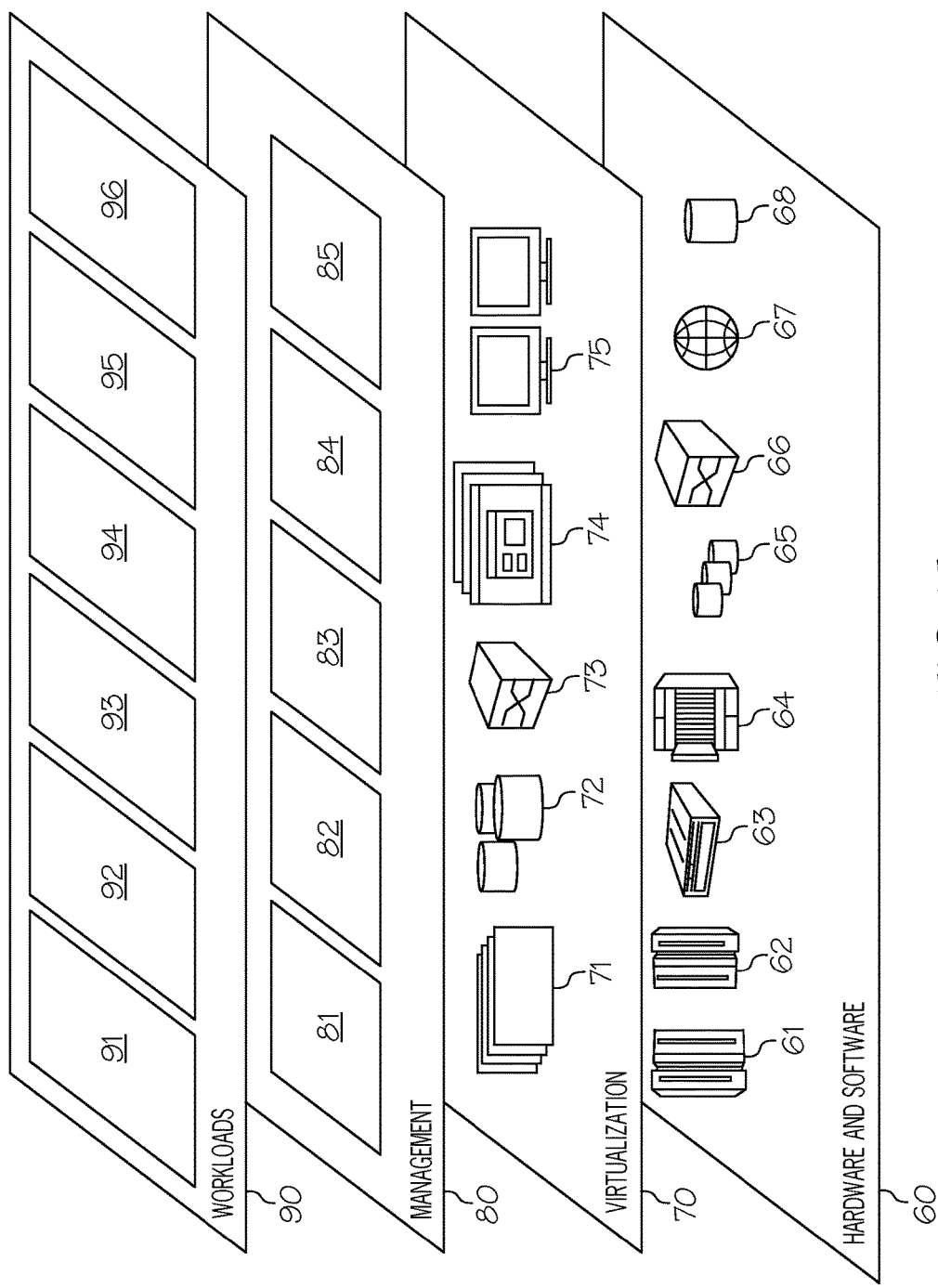
FIG. 15 depicts abstraction model layers according to an embodiment of the present disclosure.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hardware protection processing 96 (for protecting hardware devices through use of secure processor as described herein).

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of protecting access to hardware devices through use of a secure processor, the method comprising:
receiving, by a security computer, a request from a requesting computer for access to a hardware device on a network, wherein access to the hardware device is established by an application;
in response to receiving the request, encrypting, by a first secure processor within the security computer, the request to generate an encrypted request, wherein the encrypted request is generated within a core of the first secure processor, and wherein the first secure processor protects a secure application that is used to process the request from other software on the first secure processor;
transmitting, from the security computer to the hardware device, the encrypted request, wherein the encrypted request comprises an address and identification of the requesting computer;
receiving, by the security computer, an encrypted acknowledgement of the encrypted request, wherein the encrypted acknowledgement was generated by a processor associated with the hardware device;
in response to receiving the encrypted acknowledgement, decrypting the encrypted acknowledgement and creating, by the security computer, a communication session between the requesting computer and the hardware device; and
controlling, by the first secure processor, access to the hardware device by the requesting computer by requiring the requesting computer to provide an encrypted private key needed by the first secure processor to access an operating system that is required to execute the application that accesses the hardware device.

2. The computer-implemented method of claim 1, wherein the hardware device is a legacy hardware sensor, and wherein the computer-implemented method further comprises:
accessing, by the security computer, a legacy sensor access system with the encrypted request, wherein the legacy sensor access system comprises a second secure processor, wherein the second secure processor decrypts the encrypted request to open a port between the legacy hardware sensor and the security computer.

3. The computer-implemented method of claim 1, wherein the hardware device is a legacy mechanical actuator, and wherein the computer-implemented method further comprises:
accessing, by the security computer, a legacy actuator access system with the encrypted request, wherein the legacy actuator access system comprises a second secure processor, wherein the second secure processor decrypts the encrypted request to open a port between the legacy mechanical actuator and the security computer.

4. The computer-implemented method of claim 1, wherein the processor associated with the hardware device is a second secure processor.

5. The computer-implemented method of claim 1, wherein the hardware device is a cloud of hardware resources.

6. The computer-implemented method of claim 1, wherein the hardware device is a cloud of computing devices.

7. A computer program product for protecting access to hardware devices through use of a secure processor, the computer program product comprising a non-transitory computer readable storage medium having program code embodied therewith, the program code readable and executable by one or more processors to perform a method comprising:
receiving, by a security computer, a request from a requesting computer for access to a hardware device on a network, wherein access to the hardware device is established by an application;
in response to receiving the request, encrypting, by a first secure processor within the security computer, the request to generate an encrypted request, wherein the encrypted request is generated within a core of the first secure processor, and wherein the first secure processor protects a secure application that is used to process the request from other software on the first secure processor;
transmitting, from the security computer to the hardware device, the encrypted request, wherein the encrypted request comprises an address and identification of the requesting computer;
receiving, by the security computer, an encrypted acknowledgement of the encrypted request, wherein the encrypted acknowledgement was generated by a processor associated with the hardware device;
in response to receiving the encrypted acknowledgement, decrypting the encrypted acknowledgement and creating, by the security computer, a communication session between the requesting computer and the hardware device; and
controlling, by the first secure processor, access to the hardware device by the requesting computer by requiring the requesting computer to provide an encrypted private key needed by the first secure processor to access an operating system that is required to execute the application that accesses the hardware device.

8. The computer program product of claim 7, wherein the hardware device is a legacy hardware sensor, and wherein the method further comprises:
accessing, by the security computer, a legacy sensor access system with the encrypted request, wherein the legacy sensor access system comprises a second secure processor, wherein the second secure processor decrypts the encrypted request to open a port between the legacy hardware sensor and the security computer.

9. The computer program product of claim 7, wherein the hardware device is a legacy mechanical actuator, and wherein the method further comprises:
accessing, by the security computer, a legacy actuator access system with the encrypted request, wherein the legacy actuator access system comprises a second secure processor, wherein the second secure processor decrypts the encrypted request to open a port between the legacy mechanical actuator and the security computer.

10. The computer program product of claim 7, wherein the processor associated with the hardware device is a second secure processor.

11. The computer program product of claim 7, wherein the hardware device is a cloud of hardware resources.

12. The computer program product of claim 7, wherein the hardware device is a cloud of computing devices.

13. A computer system comprising:
a processor, a computer readable memory, and a computer readable storage medium;
first program instructions to receive, by a security computer, a request from a requesting computer for access to a hardware device on a network, wherein access to the hardware device is established by an application;
second program instructions to, in response to receiving the request, encrypt, by a first secure processor within the security computer, the request to generate an encrypted request, wherein the encrypted request is generated within a core of the first secure processor, and wherein the first secure processor protects a secure application that is used to process the request from other software on the first secure processor;
third program instructions to transmit, from the security computer to the hardware device, the encrypted request, wherein the encrypted request comprises an address and identification of the requesting computer;
fourth program instructions to receive, by the security computer, an encrypted acknowledgement of the encrypted request, wherein the encrypted acknowledgement was generated by a processor associated with the hardware device;
fifth program instructions to, in response to receiving the encrypted acknowledgement, decrypt the encrypted acknowledgement and to create, by the security computer, a communication session between the requesting computer and the hardware device; and
sixth program instructions to control, by the first secure processor, access to the hardware device by the requesting computer by requiring the requesting computer to provide an encrypted private key needed by the first secure processor to access an operating system that is required to execute the application that accesses the hardware device; and wherein
the first, second, third, fourth, fifth, and sixth program instructions are stored on the non-transitory computer readable storage medium and executed by the processor via the computer readable memory.

14. The computer system of claim 13, wherein the hardware device is a legacy hardware sensor, and wherein the computer system further comprises:
seventh program instructions to access, by the security computer, a legacy sensor access system with the encrypted request, wherein the legacy sensor access system comprises a second secure processor, wherein the second secure processor decrypts the encrypted request to open a port between the legacy hardware sensor and the security computer; and wherein the seventh program instructions are stored on the non-transitory computer readable storage medium and executed by the processor via the computer readable memory.

15. The computer system of claim 13, wherein the hardware device is a legacy mechanical actuator, and wherein the computer system further comprises:
seventh program instructions to access, by the security computer, a legacy actuator access system with the encrypted request, wherein the legacy actuator access system comprises a second secure processor, wherein the second secure processor decrypts the encrypted request to open a port between the legacy mechanical actuator and the security computer; and wherein the seventh program instructions are stored on the non-transitory computer readable storage medium and executed by the processor via the computer readable memory.

16. The computer system of claim 13, wherein the processor associated with the hardware device is a second secure processor.

17. The computer system of claim 13, wherein the hardware device is a cloud of computing devices.

* * * * *